United States Patent
Chen et al.

(10) Patent No.: US 11,627,540 B2
(45) Date of Patent: *Apr. 11, 2023

(54) METHOD AND APPARATUS FOR DETECTING SIGNALING MESSAGE, AND STORAGE MEDIUM

(71) Applicant: ZTE CORPORATION, Shenzhen (CN)

(72) Inventors: Yijian Chen, Shenzhen (CN); Zhaohua Lu, Shenzhen (CN); Yu Ngok Li, Shenzhen (CN); Peng Hao, Shenzhen (CN); Hao Wu, Shenzhen (CN); Bo Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 3 days.

This patent is subject to a terminal disclaimer.

(21) Appl. No.: 17/321,781

(22) Filed: May 17, 2021

(65) Prior Publication Data

US 2021/0274453 A1    Sep. 2, 2021

Related U.S. Application Data

(63) Continuation of application No. 16/323,937, filed as application No. PCT/CN2017/097362 on Aug. 14, 2017, now Pat. No. 11,044,686.

(30) Foreign Application Priority Data

Aug. 12, 2016  (CN) .......................... 201610668133.5

(51) Int. Cl.
*H04L 5/00*    (2006.01)
*H04W 56/00*    (2009.01)
(Continued)

(52) U.S. Cl.
CPC ......... *H04W 56/001* (2013.01); *H04W 56/00* (2013.01); *H04W 72/0406* (2013.01); *H04W 72/0446* (2013.01)

(58) Field of Classification Search
CPC ... H04L 5/0023; H04L 5/0048; H04L 5/0053; H04L 5/006; H04W 56/00; H04W 56/001; H04W 72/0406; H04W 72/0446
See application file for complete search history.

(56) References Cited

U.S. PATENT DOCUMENTS 8,199,712 B2 *  6/2012  Qu .................... H04L 5/0007
                                                 370/329
9,762,425 B2 *  9/2017  Kang ................. H04L 5/0037
(Continued)

FOREIGN PATENT DOCUMENTS

CN    104205674 A    12/2014
CN    104219757 A    12/2014
(Continued)

OTHER PUBLICATIONS

Chinese Office Action, Application 201610668133.5, pp. 1-18.
International Search Report and Written Opinion for International Appl. No. PCT/CN2017/097362, dated Oct. 27, 2017.

*Primary Examiner* — Alpus Hsu
(74) *Attorney, Agent, or Firm* — George McGuire

(57) ABSTRACT

The present disclosure provides a method and apparatus for detecting signaling message, and storage medium. The method comprises: detecting synchronization signals and implementing synchronization; determining transmission resource locations of first-class signaling messages associated with the synchronization signals according to the synchronization signals; and receiving the first-class signaling messages on the transmission resource locations.

17 Claims, 13 Drawing Sheets

(51) Int. Cl.
*H04W 72/04* (2009.01)
*H04W 72/0446* (2023.01)

(56) References Cited

U.S. PATENT DOCUMENTS

| | | | |
|---|---|---|---|
| 10,359,499 B2* | 7/2019 | Zhang | H04W 72/1247 |
| 10,440,636 B2* | 10/2019 | Einhaus | H04L 5/0048 |
| 2013/0252606 A1 | 9/2013 | Nimbalker et al. | |
| 2014/0169316 A1* | 6/2014 | Kim | H04L 5/0053 |
| | | | 370/329 |
| 2016/0308637 A1* | 10/2016 | Frenne | H04L 5/0048 |
| 2017/0150461 A1 | 5/2017 | Li et al. | |

FOREIGN PATENT DOCUMENTS

| | | |
|---|---|---|
| CN | 105474556 A | 4/2016 |
| CN | 105490719 A | 4/2016 |
| CN | 105723639 A | 6/2016 |
| KR | 20140035930 A | 3/2014 |
| WO | 2015080646 A1 | 6/2015 |
| WO | 2015172506 A1 | 11/2015 |

* cited by examiner

METHOD AND APPARATUS FOR DETECTING SIGNALING MESSAGE, AND STORAGE MEDIUM

CROSS-REFERENCE TO RELATED APPLICATIONS

This application is a continuation of U.S. application Ser. No. 16/323,937, which claims priority to Chinese patent application No. 201610668133.5 filed on Aug. 12, 2016, the disclosures of all of which are incorporated herein by reference in their entireties.

TECHNICAL FIELD

The present disclosure relates to the field of communications, and in particular to a method and apparatus for detecting signaling message, and storage medium.

BACKGROUND

In a wireless communication system, after starting up, a terminal may perform cell searching to detect a synchronization sequence. After a cell searching process is completed, UE has obtained downlink synchronization with a cell to obtain a PCI of the cell and obtained synchronization of a subframe and a system frame. Then, the UE needs to acquire system information of the cell, in this way, know how the cell is configured, so as to access the cell and work correctly in the cell. In a 4G long-term evolution (LTE) system, the system information of the cell is transmitted in a physical layer broadcast channel; the system message transmitted in the physical layer broadcast channel of the 4G is cell-level information, that is, take effect for all UEs accessing the cell. The system information may include a master information block (MIB) and multiple system information blocks (SIB). Each piece of system information includes a series of parameter sets related to a certain function. Some specific types of the system information are shown in Table 1.

Not all of the SIBs must exist. For example, for a base station deployed by an operator, no SIBS is needed; and if a certain cell does not provide a MBMS, no SIB13 is needed. The cell will continuously broadcast these pieces of system information.

The MIB includes some very important broadcast messages, and may be transported on a physical broadcast channel (PBCH). FIG. 1 is a processing procedure of a transmission end of transmitting a MIB on a PBCH in a LTE. FIG. 1(a) is a first schematic diagram of a processing procedure of a transmission end of transmitting a MIB on a PBCH in a LTE in the related art of the present disclosure, and FIG. 1(b) is a second schematic diagram of a processing procedure of a transmission end of transmitting a MIB on a PBCH in a LTE in the related art of the present disclosure. In these drawings, a PCFICH, a PHICH, a PDCCH, the PBCH, and the like are all channels.

SIB messages may be transmitted on data channels, and their transmission resources may be configured and indicated on a public control channel (corresponding to a common search space of the PDCCH);

A transmission period of the SIB1 message is 80 ms. A transmission period of other system messages is configured by the SIB1. See the IE:aSystemInformationBlockType1 field: SchedulingInfoList of 36.331.

It should be noted that some of the system messages in the LTE of the related art are introduced in the foregoing. In the subsequent evolution of a LTE standard version, some other types of system messages may be added; and in other systems and evolutions of the other systems, there may be some differences in types of the system messages, and changes in their names;

In the LTE system of the related art, a broadcast channel is transmitted by using a wide RF beam. Applicants have found that due to the increase in the number of antennas and the application of high frequency, a trend is to use a narrow beam for transmission, and a wide beam may neither meet the coverage requirement nor give full play to the advantages of multiple antennas. After the RF beam is introduced,

TABLE 1

| Type | Content | Period (ms) | Transport channel |
|---|---|---|---|
| MIB | Including a limited number of parameters that are most important and most frequently transmitted. UE must use these parameters to acquire other system information. Relevant parameters are in the IE:MasterInformationBlock of the protocol specification TS 36.331 of the 3GPP | 40 | BCH |
| SIB1 | Including parameters for determining whether a certain cell is suitable for cell selection, and time-domain scheduling information of other SIBs. See the IE:SystemInformationBlockType1 of 36.331 | 80 | DL-SCH |
| SIB2 | Including public wireless resource configuration information, which is common to all UEs. | Configured by the SIB1. See the IE:SystemInformationBlockType1 field: Scheduling InfoList of 36.331 | DL-SCH |
| SIB3-8 | Including parameters related to intra-frequency, inter-frequency and inter-RAT cell reselection | | DL-SCH |
| SIB9 | Including a name of a home eNodeB | | DL-SCH |
| SIB10-12 | Including earthquake, ETWS and CMAS warning messages | | DL-SCH |
| SIB13 | Including MBMS control information related to one or more MBSFN areas | | DL-SCH | an original case where a channel or signal transmitted by a wide beam may cover the entire cell becomes a case where synchronization signals transmitted by multiple narrow beams may cover the entire cell. FIG. 2 is a schematic diagram of transmission of wide and narrow beams in the related art of the present disclosure.

A manner in the related art still uses the wide beam for transmission, which brings about problems of coverage and efficiency of the broadcast channel.

In view of the above problems in the related art, no effective solution has been found yet.

SUMMARY

Embodiments of the present disclosure provide a transmission apparatus, a detection apparatus and a transmission system of signaling messages, so as to at least solve problems of coverage and efficiency of a broadcast channel which are caused during wide beam transmission in the related art.

According to one embodiment of the present disclosure, a method for transmitting signaling messages is provided, including: determining N groups of synchronization signals and transmission resources corresponding to the N groups of synchronization signals, wherein $N>=1$; determining M sets of first-class signaling messages associated with the N groups of synchronization signals, wherein $M<=N$; determining locations of the transmission resources of the M sets of first-class signaling messages; and respectively transmitting the N groups of synchronization signals and the first-class signaling messages on the transmission resources and the locations of the transmission resources.

Alternatively, the N groups of synchronization signals correspond to configuration information of N different types of transmission resources.

Alternatively, the transmission resources include at least one of the following: beam resources, port resources, antenna resources, frequency-domain resources, sequence resources and time-domain resources.

Alternatively, the first-class signaling messages include at least one of the following: a configuration message of a system parameter, or a configuration message of a broadcast parameter, or a configuration message of a multicast parameter, a physical layer control message indicating a physical layer transport configuration of the system parameter, or the configuration message of the broadcast parameter, or the configuration message of the multicast parameter.

Alternatively, the first-class signaling messages include at least one of the following: a signaling configuration message transmitted in a physical broadcast or multicast channel, or a signaling configuration message transmitted in a physical control channel, wherein the signaling configuration message includes a common control message and a specialized control message.

Alternatively, an association relationship between the synchronization signals and the first-class signaling messages include:

a reference demodulation relationship between transport of the first-class signaling messages and transport of the synchronization signals;

A correspondence relationship between the transport of the first-class signaling messages and the transport of the synchronization signals and one of the following: transmission beams, reception beams, virtual sectors, ports, antennas and transport nodes;

a quasi-co-location relationship between a transmission signal of the first-class signaling messages and a transmission signal of the synchronization signals; and an association relationship between a scrambling manner of the first-class signaling messages and resource locations used to transmit the synchronization signals, wherein the resource location includes at least one of the following: sequences, sequence locations, beams, sectors, antennas and ports.

Alternatively, one set of the first-class signaling messages is associated with one or more groups of the synchronization signals.

Alternatively, the association relationship between the M sets of first-class signaling messages and the N groups of synchronization signals is determined by a type of the first-class signaling messages.

Alternatively, the determining M sets of first-class signaling messages associated with the N groups of synchronization signals includes: determining M sets of first-class signaling messages associated with the N groups of synchronization signals according to the type of the first signaling messages.

Alternatively, the determining M sets of first-class signaling messages associated with the N groups of synchronization signals includes: acquiring a configuration parameter used to indicate the association relationship between the M sets of first-class signaling messages and the N groups of synchronization signals; and determining M sets of first-class signaling messages associated with the N groups of synchronization signals according to the configuration information.

Alternatively, the configuration information includes a value of the M and a number of groups of synchronization signals associated with the first-class signaling messages.

Alternatively, a scrambling code of the first-class signaling messages is determined according to a resource index used by the synchronization signals associated with the first-class signaling messages.

Alternatively, the determining locations of the transmission resources of the M sets of first-class signaling messages includes: performing frequency division and/or time division on the transmission resources of synchronization signals associated with the first-class signaling messages to obtain the transmission resources of the first-class signaling messages.

Alternatively, the determining locations of the transmission resources of the M sets of first-class signaling messages includes one of the following:

the locations of the transmission resources of the first-class signaling messages are in the same time-domain symbols as the synchronization signals bound thereto;

the locations of the transmission resources of the first-class signaling messages are in the same time-domain symbols as the synchronization signals bound thereto and X1 time-domain symbols behind the synchronization signals bound thereto, wherein the X1 time-domain symbols are consecutive time-domain symbols;

the locations of the transmission resources of the first-class signaling messages are in the same time-domain symbols as the synchronization signals bound thereto and X2 time-domain symbols preceding the synchronization signals bound thereto, wherein the X2 time-domain symbols are consecutive time-domain symbols;

the locations of the transmission resources of the first-class signaling messages are in the same time-domain symbols as the synchronization signals bound thereto and X1 time-domain symbols behind the synchronization signals bound thereto as well as X2 time-domain symbols preceding the synchronization signals bound thereto, wherein the X1 time-domain symbols and the X2 time-domain symbols are consecutive time-domain symbols; and the locations of the transmission resources of the first-class signaling messages are in Y1 time-domain symbols behind or preceding the synchronization signals bound thereto.

Alternatively, when the locations of the transmission resources of the first-class signaling messages are in Y1 time-domain symbols behind or preceding the synchronization signals bound thereto, at least one of the following is also included:

locations of the Y1 time-domain symbols are determined according to a resource index of the bound synchronization signals; and the locations of the Y1 time-domain symbols are adjacent to the bound synchronization signals.

Alternatively, the embodiment further includes: indicating mapping information of the first-class signaling messages by using the synchronization signals, wherein the mapping information includes bandwidths, locations and multiplexing manners.

According to one embodiment of the present disclosure, another transmission method of another signaling message is provided, including: determining first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; classifying the first-class signaling messages into at least two groups; and transmitting the grouped first-class signaling messages.

Alternatively, the classifying the first-class signaling messages into at least two groups includes: classifying the first-class signaling messages into at least two groups according to an agreement of a transmission end and a reception end of the first-class signaling messages.

Alternatively, the classifying the first-class signaling messages into at least two groups includes one of the following:

classifying the first-class signaling messages into at least two groups according to a type of the first-class signaling messages;

classifying the first-class signaling messages into at least two groups according to a transmission period of the first-class signaling messages; and classifying the first-class signaling messages into at least two groups according to an overhead size of the first-class signaling messages.

Alternatively, the transmitting the grouped first-class signaling messages includes one of the following:

determining at least one of the following parameters used by the transmission according to the group to which the first-class signaling messages belong: transmission beams, transmitting ports, transmission sectors and a number of sectors;

determining a size of time-frequency resources used by the transmission according to the group to which the first-class signaling messages belong; and determining a configuration of a reference demodulation signal used by the transmission according to the group to which the first-class signaling messages belong.

Alternatively, the transmitting the grouped first-class signaling messages includes: transmitting at least one group of information on a first-class channel; transmitting transmission parameter configuration information of a second-class channel on the first-class channel; and transmitting information included by another group of first-class signaling messages on the second-class channel, wherein a transmission bandwidth of the first-class channel is agreed by the transmission end or the reception end.

Alternatively, the transmission parameter configuration information includes one or more of the following:

a transmitting port and an antenna configuration of the second-class channel;

a transmission sector and a beam configuration of the second-class channel;

a transmission technique configuration of the second-class channel;

a beam configuration of the second-class channel;

a time-domain resource size/location configuration of the second-class channel;

a frequency-domain resource size/location configuration of the second-class channel;

a power configuration of the second-class channel;

a corresponding pilot configuration of the second-class channel; and a time-frequency resource mapping configuration of the second-class channel.

Alternatively, the first-class channel is a first physical broadcast or multicast channel, and the second-class channel is a second physical broadcast or multicast channel.

Alternatively, there is at least one time interval Ts between the first-class channel and the second-class channel, Alternatively, the time interval Ts is greater than or equal to the minimum transmission duration of the first-class channel, and another first-class channel is transmitted in the time interval Ts.

Alternatively, the time interval Ts is greater than or equal to the minimum transmission duration of the synchronization signals, and the synchronization signals are transmitted in the time interval Ts.

Alternatively, the transmission of the first-class channel is greater than the transmission of the second-class channel by using the following parameters: transmission beams, transmission sectors and a number of ports.

According to one embodiment of the present disclosure, yet another method for transmitting signaling messages is provided, including: determining first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; determining transmission resources of the first-class signaling messages; transmitting the first-class signaling messages on the transmission resources; transmitting synchronization signals and indicating transmission resources of the first-class signalings by a sequence of the synchronization signals, or configuring the transmission resources of the first-class signalings by a signaling.

Alternatively, before the transmitting the first-class signaling messages on the transmission resources, the method further includes: classifying the first-class signalings into at least two groups, wherein the at least two groups of first-class signalings respectively correspond to the configured transmission resources.

According to one embodiment of the present disclosure, a detection method of signaling messages is provided, including: detecting synchronization signals and implementing synchronization; and determining locations of transmission resources of first-class signaling messages associated with the synchronization signals according to the synchronization signals; and receiving the first-class signaling messages on the locations of the resources.

Alternatively, the first-class signaling messages include at least one of the following: a configuration message of a system parameter, or a configuration message of a broadcast parameter, or a configuration message of a multicast parameter, a physical layer control message indicating a physical layer transport configuration of the system parameter, a signaling configuration message transmitted in a physical broadcast or multicast channel, and a signaling configuration message transmitted in a physical control channel, wherein the signaling configuration message includes a common control message and a specialized control message.

Alternatively, an association relationship between the synchronization signals and the first-class signaling messages includes:

a reference demodulation relationship between transport of the first-class signaling messages and transport of the synchronization signals;

a correspondence relationship between the transport of the first-class signaling messages and the transport of the synchronization signals and one of the following: transmission beams, reception beams, virtual sectors, ports, antennas and transport nodes;

a quasi-co-location relationship between a transmission signal of the first-class signaling messages and a transmission signal of the synchronization signals; and an association relationship between a scrambling manner of the first-class signaling messages and resource locations used to transmit the synchronization signals, wherein the resource location includes at least one of the following: sequences, sequence locations, beams, sectors, antennas and ports.

Alternatively, the determining locations of transmission resources of first-class signaling messages associated with the synchronization signals according to the synchronization signals includes one of the following:

the locations of the transmission resources of the first-class signaling messages are in the same time-domain symbols as the synchronization signals bound thereto;

the locations of the transmission resources of the first-class signaling messages are in the same time-domain symbols as the synchronization signals bound thereto and X1 time-domain symbols behind the synchronization signals bound thereto, wherein the X1 time-domain symbols are consecutive time-domain symbols;

the locations of the transmission resources of the first-class signaling messages are in the same time-domain symbols as the synchronization signals bound thereto and X2 time-domain symbols preceding the synchronization signals bound thereto, wherein the X2 time-domain symbols are consecutive time-domain symbols;

the locations of the transmission resources of the first-class signaling messages are in the same time-domain symbols as the synchronization signals bound thereto and X1 time-domain symbols behind the synchronization signals bound thereto as well as X2 time-domain symbols preceding the synchronization signals bound thereto, wherein the X1 time-domain symbols and the X2 time-domain symbols are consecutive time-domain symbols; and the locations of the transmission resources of the first-class signaling messages are in Y1 time-domain symbols behind or preceding the synchronization signals bound thereto.

Alternatively, when the locations of the transmission resources of the first-class signaling messages are in Y1 time-domain symbols behind or preceding the synchronization signals bound thereto, at least one of the following is also included:

locations of the Y1 time-domain symbols are determined according to a resource index of the bound synchronization signals; and the locations of the Y1 time-domain symbols are adjacent to the bound synchronization signals.

Alternatively, the synchronization signals are used for indicating mapping information of the first-class signaling messages, wherein the mapping information includes bandwidths, locations and multiplexing manners.

Alternatively, a scrambling code of the first-class signaling messages is determined according to a resource index used by the synchronization signals associated with the first-class signaling messages.

According to one embodiment of the present disclosure, further detection method of signaling messages is provided, including: determining first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; detecting synchronization signals, and determining a sequence of the synchronization signals; determining locations of transmission resources of the first-class signalings according to the sequence of the synchronization signals; and detecting the first-class signaling messages on the locations of the transmission resources.

According to one embodiment of the present disclosure, a transmission apparatus of signaling messages is provided, including a first determination module, which is configured to determine N groups of synchronization signals and transmission resources corresponding to the N groups of synchronization signals, wherein N>=1; a second determination module, which is configured to determine M sets of first-class signaling messages associated with the N groups of synchronization signals, wherein M<=N; a third determination module, which is configured to determine locations of the transmission resources of the M sets of first-class signaling messages; and a transmission module, which is configured to respectively transmit the N groups of synchronization signals and the first-class signaling messages on the transmission resources and the locations of the transmission resources.

According to one embodiment of the present disclosure, a transmission apparatus of signaling messages is provided, including a determination module, which is configured to determine first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; a grouping module, which is configured to classify the first-class signaling messages into at least two groups; and a transmission module, which is configured to transmit the grouped first-class signaling messages.

According to one embodiment of the present disclosure, a transmission apparatus of signaling messages is provided, including a first determination module, which is configured to determine first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; a second determination module, which is configured to determine transmission resources of the first-class signaling messages; a transmission module, which is configured to transmit the first-class signaling messages on the transmission resources; and a processing module, which is configured to transmit synchronization signals and indicate transmission resources of the first-class signalings by a sequence of the synchronization signals, or configure the transmission resources of the first-class signalings by a signaling.

According to one embodiment of the present disclosure, a detection apparatus of signaling messages is provided, including a detection module, which is configured to detect synchronization signals and implement synchronization; a determination module, which is configured to determine locations of transmission resources of first-class signaling messages associated with the synchronization signals according to the synchronization signals; and a reception module, which is configured to receive the first-class signaling messages on the locations of the resources.

According to one embodiment of the present disclosure, a detection apparatus of signaling messages is provided, including a first determination module, which is configured to determine first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; a first detection module, which is configured to detect synchronization signals, and determine a sequence of the synchronization signals; a second determination module, which is configured to determine locations of transmission resources of the first-class signalings according to the sequence of the synchronization signals; and a second detection module, which is configured to detect the first-class signaling messages on the locations of the transmission resources.

According to one embodiment of the present disclosure, a transmission system of signaling messages is provided, including a transmission end and a reception end, wherein the transmission end includes a first determination module, which is configured to determine N groups of synchronization signals and transmission resources corresponding to the N groups of synchronization signals, wherein N>=1; a second determination module, which is configured to determine M sets of first-class signaling messages associated with the N groups of synchronization signals, wherein M<=N; a third determination module, which is configured to determine locations of the transmission resources of the M sets of first-class signaling messages; and a transmission module, which is configured to respectively transmit the N groups of synchronization signals and the first-class signaling messages on the transmission resources and the locations of the transmission resources; and the reception end includes a detection module, which is configured to detect the synchronization signals and implement synchronization; a fourth determination module, which is configured to determine locations of the transmission resources of the first-class signaling messages associated with the synchronization signals according to the synchronization signals; and a reception module, which is configured to receive the first-class signaling messages on the locations of the resources.

According to one embodiment of the present disclosure, a transmission system of signaling messages is provided, including a transmission end and a reception end, wherein the transmission end includes a first determination module, which is configured to determine first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; a second determination module, which is configured to determine transmission resources of the first-class signaling messages; a transmission module, which is configured to transmit the first-class signaling messages on the transmission resources; and a processing module, which is configured to transmit synchronization signals and indicate the transmission resources of the first-class signalings according to a sequence of the synchronization signals, or configure the transmission resources of the first-class signalings by a signaling; and the reception end includes a third determination module, which is configured to determine the first-class signaling messages; a first detection module, which is configured to detect the synchronization signals, and determine a sequence of the synchronization signals; a fourth determination module, which is configured to determine locations of the transmission resources of the first-class signalings according to the sequence of the synchronization signals; and a second detection module, which is configured to detect the first-class signaling messages on the locations of the transmission resources.

According to yet another embodiment of the present disclosure, a storage medium is further provided. The storage medium is configured to store a program code used for performing the following steps:

determining N groups of synchronization signals and transmission resources corresponding to the N groups of synchronization signals, wherein $N>=1$;

determining M sets of first-class signaling messages associated with the N groups of synchronization signals, wherein $M<=N$;

determining locations of the transmission resources of the M sets of first-class signaling messages; and respectively transmitting the N groups of synchronization signals and the first-class signaling messages on the transmission resources and the locations of the transmission resources.

According to the embodiment of the present disclosure, N groups of synchronization signals and transmission resources corresponding to the N groups of synchronization signals are determined, wherein $N>=1$; M sets of first-class signaling messages associated with the N groups of synchronization signals are determined, wherein $M<=N$; and the N groups of synchronization signals and the first-class signaling messages are respectively transmitted on the transmission resources and the locations of the transmission resources. By means of the present disclosure, the problems of coverage and efficiency of a broadcast channel which are caused during wide beam transmission in the related art are solved. Needs of users of different ranges may be met.

BRIEF DESCRIPTION OF DRAWINGS

Accompanying drawings described herein are intended to provide a further understanding of the present disclosure, and are incorporated into and constitute a part of the present disclosure. Exemplary embodiments and its illustrations of the present disclosure are intended to explain the present disclosure, but not improperly limit the present disclosure. In the accompanying drawings.

DETAILED DESCRIPTION

The present disclosure will be described in detail below with reference to accompanying drawings in conjunction with embodiments. It should be noted that the embodiments in the present disclosure and features in the embodiments may be combined with each other without conflict.

It is to be noted that terms "first", "second", and the like in the specification and claims as well as the accompanying drawings of the present disclosure are used to distinguish similar objects, and are not necessarily used to describe a particular order or precedence order.

A First Embodiment

Figure 1A:
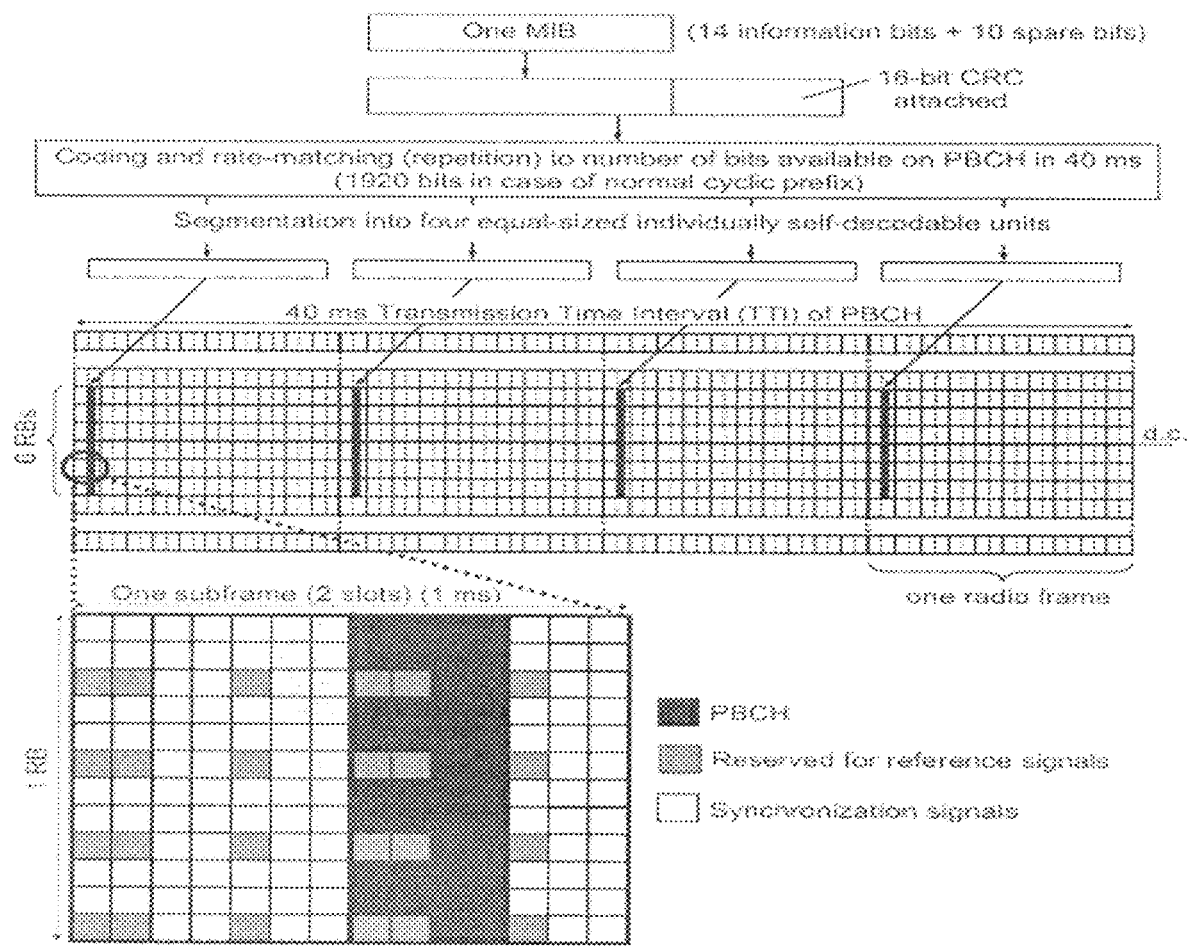
FIG. 1(a) is a first schematic diagram of a processing procedure of a transmission end of transmitting a MIB on a PBCH in a LTE in the related art of the present disclosure.
Figure 1B:
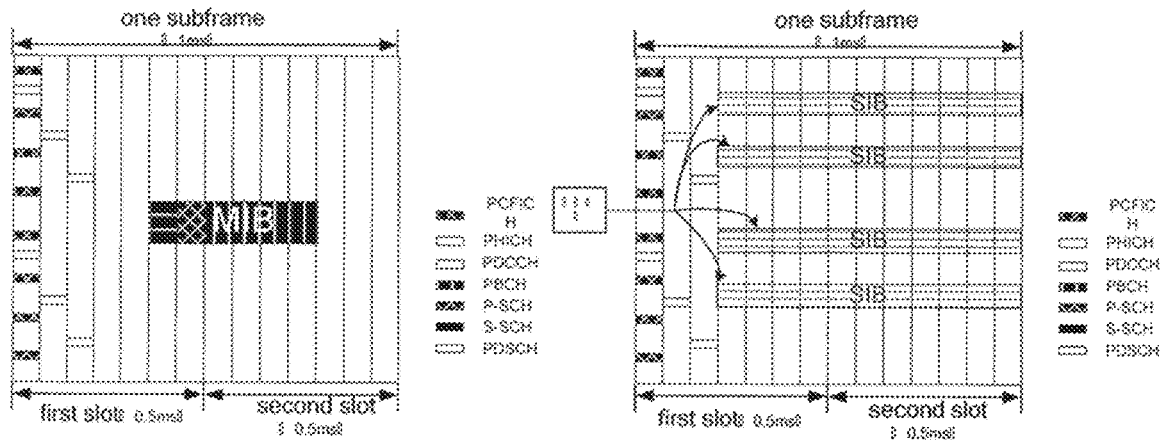
FIG. 1(b) is a second schematic diagram of a processing procedure of a transmission end of transmitting a MIB on a PBCH in a LTE in the related art of the present disclosure.
Figure 2:
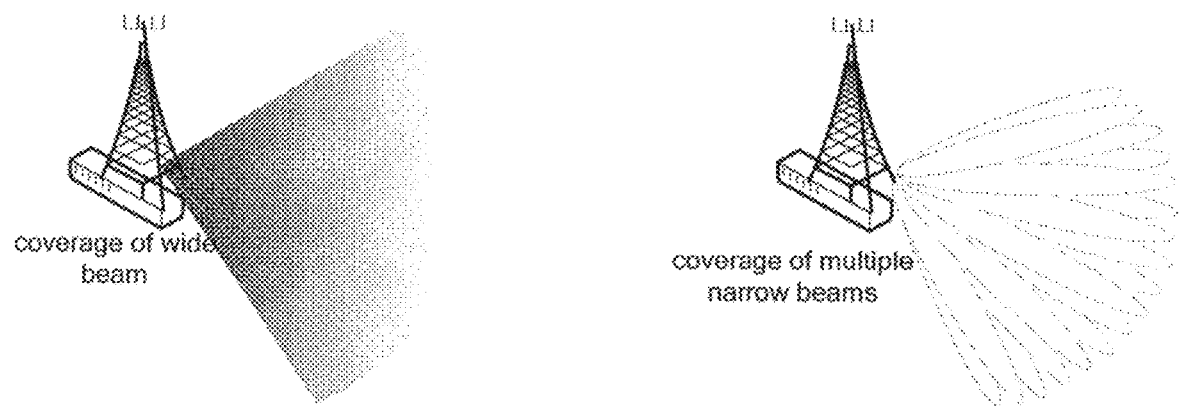
FIG. 2 is a schematic diagram of transmission of a wide beam and a narrow beam in the related art of the present disclosure.
Figure 3:
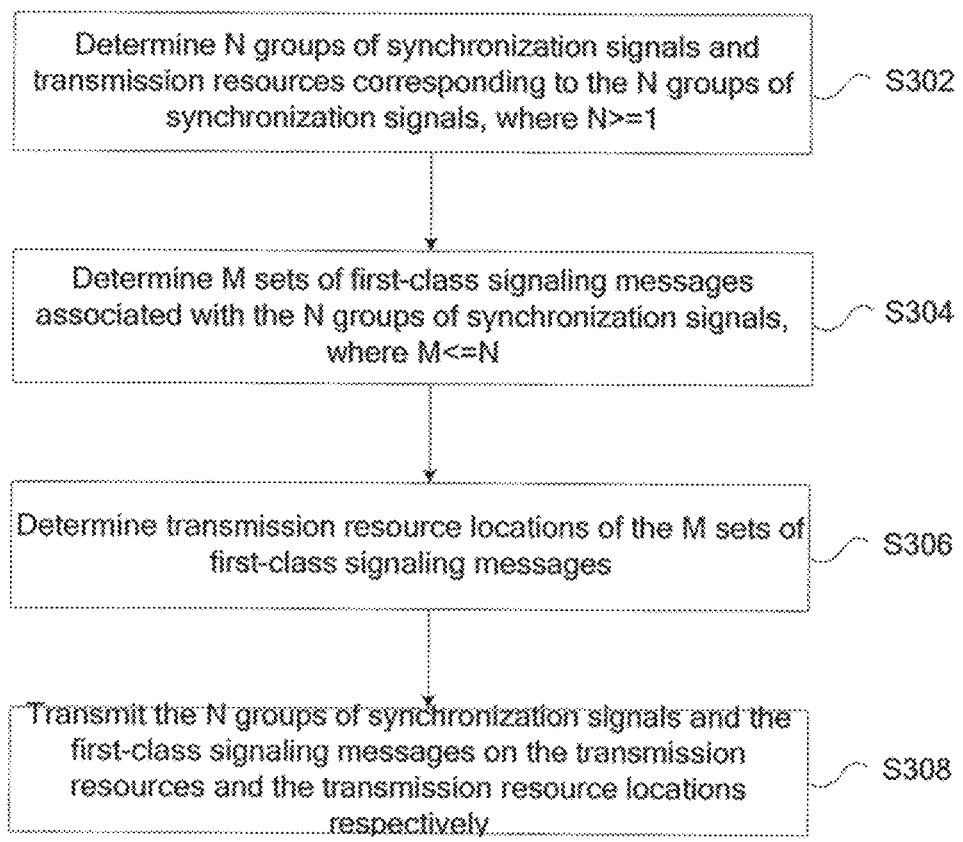
FIG. 3 is a flowchart of a method for transmitting signaling messages according to an embodiment of the present disclosure.

A method for transmitting signaling messages is provided in this embodiment. FIG. 3 is a flowchart of a method for transmitting signaling messages according to an embodiment of the present disclosure. As shown in FIG. 3, the transmission method includes the following steps:

in step S302, N groups of synchronization signals and transmission resources corresponding to the N groups of synchronization signals are determined, wherein N>=1;

in step S304, M sets of first-class signaling messages associated with the N groups of synchronization signals are determined, wherein M<=N;

in step S306, locations of the transmission resources of the M sets of first-class signaling messages are determined; and in step S308, the N groups of synchronization signals and the first-class signaling messages are respectively transmitted on the transmission resources and the locations of the transmission resources According to the embodiment of the present disclosure, N groups of synchronization signals and transmission resources corresponding to the N groups of synchronization signals are determined, wherein N>=1; M sets of first-class signaling messages associated with the N groups of synchronization signals are determined, wherein M<=N; and the N groups of synchronization signals and the first-class signaling messages are respectively transmitted on the transmission resources and the locations of the transmission resources. By means of the present disclosure, the problems of coverage and efficiency of a broadcast channel which are caused during wide beam transmission in the related art are solved. Needs of users of different ranges may be met.

Alternatively, an execution body of the foregoing steps may be a transmission end, such as a base station, a terminal, and the like, but is not limited thereto.

Alternatively, the N groups of synchronization signals correspond to configuration information of N different types of transmission resources.

Alternatively, resource types of the transmission resources include at least one of the following: beam resources, port resources, antenna resources, frequency-domain resources, sequence resources and time-domain resources.

Alternatively, the first-class signaling messages include at least one of the following:

a configuration message of a system parameter/a broadcast parameter/a multicast parameter;

a physical layer control message indicating a physical layer transmission configuration of the system parameter/the broadcast parameter/the multicast parameter;

a signaling configuration message transmitted in a physical broadcast or multicast channel;

a signaling configuration message (a common search space (CSS)/UE-specific search space (USS)) transmitted in a physical control channel, it is to be explained here that, a common control message and a specialized control message are in a scenario of the search space, which is also called the common search space and the proprietary search space. For this case, the same applies to this embodiment as well.

Alternatively, an association relationship between the synchronization signals and the first-class signaling messages includes:

a reference demodulation relationship between transport of the first-class signaling messages and transport of the synchronization signals;

a correspondence relationship between the transport of the first-class signaling messages and the transport of the synchronization signals and one of the following: transmission beams, reception beams, virtual sectors, ports, antennas and transport nodes;

a quasi-co-location relationship between a transmission signal of the first-class signaling messages and a transmission signal of the synchronization signals; and an association relationship between a scrambling manner of the first-class signaling messages and resource locations used to transmit the synchronization signals, wherein the resource location includes at least one of the following: sequences, sequence locations, beams, sectors, antennas and ports.

Alternatively, one set of the first-class signaling messages is associated with one or more groups of the synchronization signals.

Alternatively, the association relationship between the M sets of first-class signaling messages and the N groups of synchronization signals is determined by a type of the first-class signaling messages.

Alternatively, that the first-class signaling messages associated with the N groups of synchronization signals are determined includes: M sets of first-class signaling messages associated with the N groups of synchronization signals are determined according to the type of the first signaling message.

Alternatively, that the M sets of first-class signaling messages associated with the N groups of synchronization signals are determined includes:

S11, a configuration parameter used to indicate the association relationship between the M sets of first-class signaling messages and the N groups of synchronization signals is acquired; and S12, the M sets of first-class signaling messages associated with the N groups of synchronization signals are determined according to configuration information, wherein the association relationship has been illustrated above.

Alternatively, the configuration information includes a value of the M and a number of groups of synchronization signals associated with the first-class signaling messages.

Alternatively, a scrambling code of the first-class signaling messages is determined according to a resource index used by the synchronization signals associated with the first-class signaling messages.

Alternatively, that locations of the transmission resources of the M sets of first-class signaling messages are determined includes: frequency division and/or time division are/is performed the transmission resources of synchronization signals associated with the first-class signaling messages to obtain the transmission resources of the first-class signaling messages.

Alternatively, that locations of the transmission resources of the M sets of first-class signaling messages are determined includes one of the following:

the locations of the transmission resources of the first-class signaling messages are in the same time-domain symbols as the synchronization signals bound thereto;

the locations of the transmission resources of the first-class signaling messages are in the same time-domain symbols as the synchronization signals bound thereto and X1 time-domain symbols behind the synchronization signals bound thereto, wherein the X1 time-domain symbols are consecutive time-domain symbols;

the locations of the transmission resources of the first-class signaling messages are in the same time-domain symbols as the synchronization signals bound thereto and X2 time-domain symbols preceding the synchronization signals bound thereto, wherein the X2 time-domain symbols are consecutive time-domain symbols;

the locations of the transmission resources of the first-class signaling messages are in the same time-domain symbols as the synchronization signals bound thereto and X1 time-domain symbols behind the synchronization signals bound thereto as well as X2 time-domain symbols preceding the synchronization signals bound thereto, wherein the X1 time-domain symbols and the X2 time-domain symbols are consecutive time-domain symbols; and the locations of the transmission resources of the first-class signaling messages are in Y1 time-domain symbols behind or preceding the synchronization signals bound thereto.

Alternatively, when the locations of the transmission resources of the first-class signaling messages are in Y1 time-domain symbols behind or preceding the synchronization signals bound thereto, at least one of the following is also included:

locations of the Y1 time-domain symbols are determined according to a resource index of the bound synchronization signals; and the locations of the Y1 time-domain symbols are adjacent to the bound synchronization signals.

Alternatively, a solution of this embodiment further includes: mapping information of the first-class signaling messages is indicated by the synchronization signals, wherein the mapping information includes bandwidths, locations and multiplexing manners.

Figure 4:
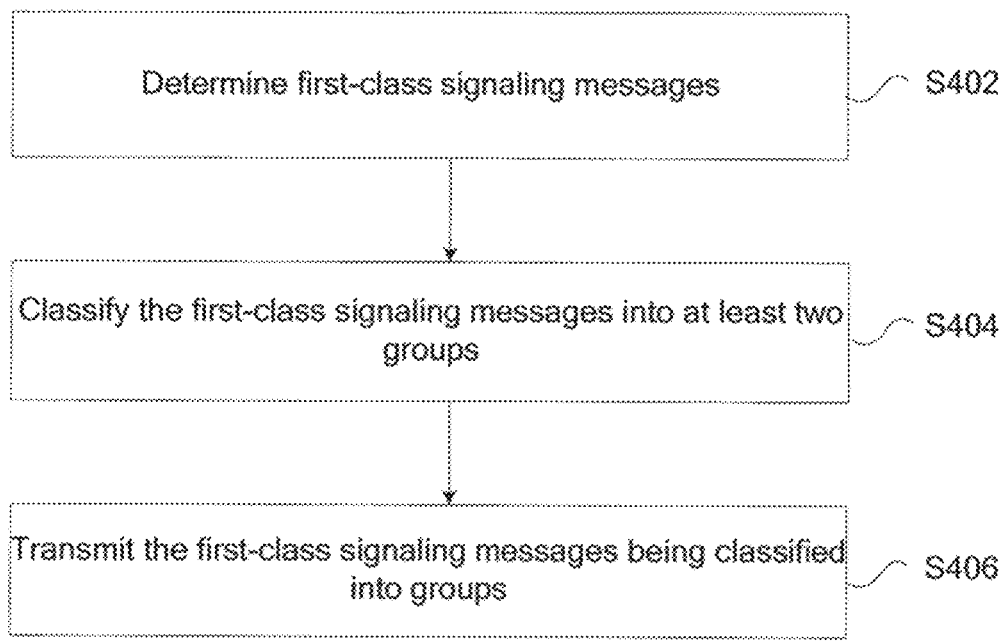
FIG. 4 is a flowchart of another method for transmitting signaling messages according to an embodiment of the present disclosure.

Another method for transmitting signaling messages is provided in this embodiment, and FIG. 4 is a flowchart of a method for transmitting signaling messages according to an embodiment of the present disclosure. As shown in FIG. 4, the transmission method includes the following steps:

in step S402, first-class signaling messages are determined, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message;

in step S404, the first-class signaling messages are classified into at least two groups; and in step S406, the grouped first-class signaling messages are transmitted.

Alternatively, that the first-class signaling messages are classified into at least two groups includes: the first-class signaling messages are classified into at least two groups according to an agreement of a transmission end and a reception end of the first-class signaling messages.

Alternatively, that the first-class signaling messages are classified into at least two groups includes one of the following rules:

the first-class signaling messages are classified into at least two groups according to a type of the first-class signaling messages;

the first-class signaling messages are classified into at least two groups according to a transmission period of the first-class signaling messages; and the first-class signaling messages are classified into at least two groups according to an overhead size of the first-class signaling messages.

Alternatively, that the grouped first-class signaling messages are transmitted includes one of the following:

at least one of the following parameters used by the transmission is determined according to the group to which the first-class signaling messages belong: transmission beams, transmitting ports, transmission sectors and a number of sectors;

a size of time-frequency resources used by the transmission is determined according to the group to which the first-class signaling messages belong; and a configuration of a reference demodulation signal used by the transmission is determined according to the group to which the first-class signaling messages belong.

Alternatively, that the grouped first-class signaling messages are transmitted includes: at least one group of information is transmitted on a first-class channel; transmission parameter configuration information of a second-class channel is transmitted on the first-class channel; and information included by another group of first-class signaling messages is transmitted on the second-class channel, wherein a transmission bandwidth of the first-class channel is agreed by the transmission end or the reception end.

In this embodiment, the transmission parameter configuration information includes one or more of the following:

a transmitting port and an antenna configuration of the second-class channel;

a transmission sector and a beam configuration of the second-class channel;

a transmission technique configuration of the second-class channel;

a beam configuration of the second-class channel;

a time-domain resource size/location configuration of the second-class channel;

a frequency-domain resource size/location configuration of the second-class channel;

a power configuration of the second-class channel;

a corresponding pilot configuration of the second-class channel; and a time-frequency resource mapping configuration of the second-class channel.

Alternatively, the first-class channel is a first physical broadcast or multicast channel, and the second-class channel is a second physical broadcast or multicast channel.

Alternatively, there is at least one time interval Ts between the first-class channel and the second-class channel, the time interval Ts is greater than or equal to the minimum transmission duration of the first-class channel, and another first-class channel is transmitted in the time interval Ts.

Alternatively, the time interval Ts is greater than or equal to the minimum transmission duration of the synchronization signals, and the synchronization signals are transmitted in the time interval Ts. Moreover, the transmission of the first-class channel is greater than the transmission of the second-class channel by using the following parameters: transmission beams, transmission sectors and a number of ports.

Figure 5:
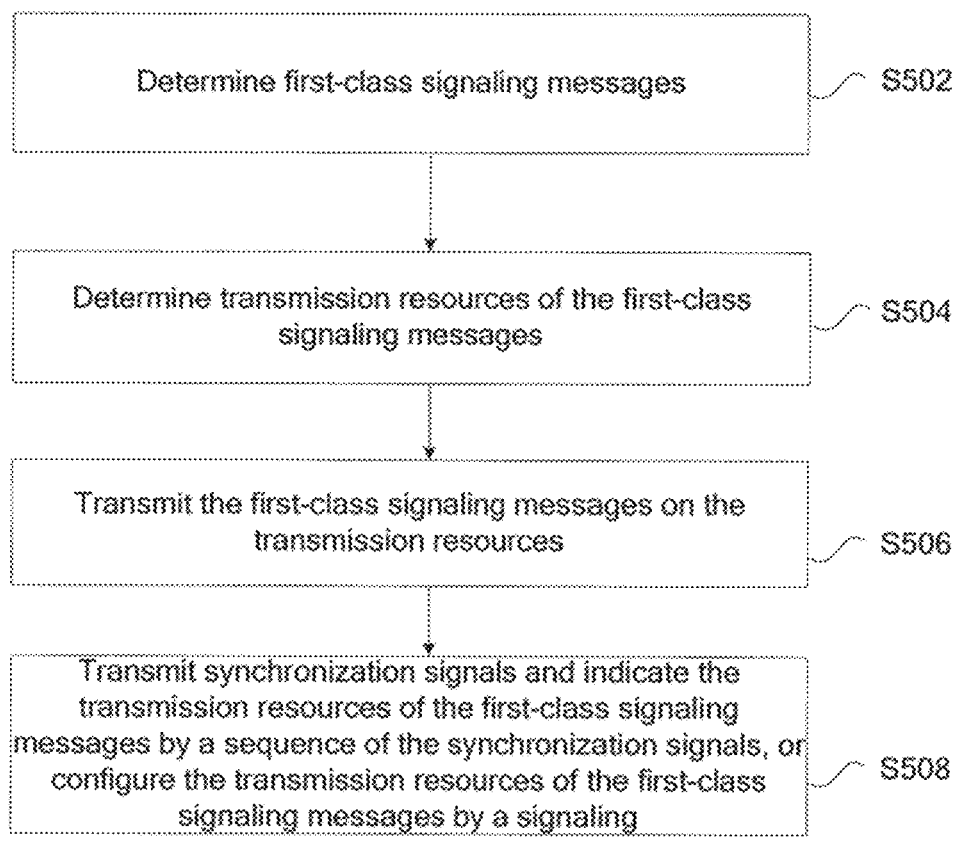
FIG. 5 is a flowchart of yet another method for transmitting signaling messages according to an embodiment of the present disclosure.

Yet another method for transmitting signaling messages is provided in this embodiment, and FIG. 5 is a flowchart of yet another method for transmitting signaling messages according to an embodiment of the present disclosure. As shown in FIG. 5, the transmission method includes the following steps:

in step S502, first-class signaling messages are determined, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message;

in step S504, transmission resources of the first-class signaling messages are determined;

in step S506, the first-class signaling messages are transmitted on the transmission resources; and in step S508, synchronization signals are transmitted and transmission resources of the first-class signalings are indicated by a sequence of the synchronization signals, or the transmission resources of the first-class signalings are configured by a signaling.

Alternatively, before the transmission of the first-class signaling messages on the transmission resources, the method further includes: first-class signalings are classified into at least two groups, wherein the at least two groups of first-class signalings respectively correspond to the configured transmission resources.

Figure 6:
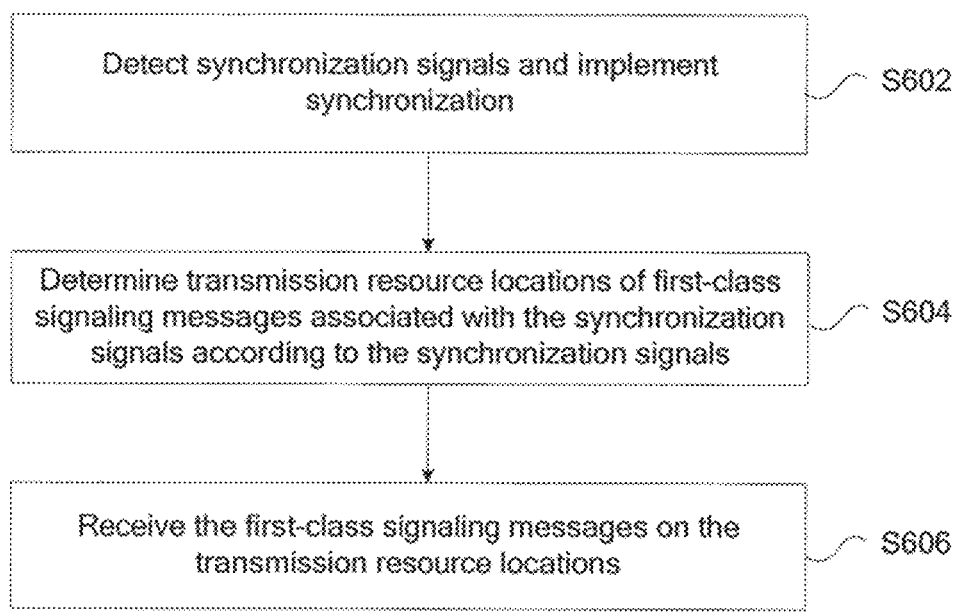
FIG. 6 is a flowchart of a detection method of signaling messages according to an embodiment of the present disclosure.

A detection method of signaling messages is provided in this embodiment, and FIG. 6 is a flowchart of a detection method of signaling messages according to an embodiment of the present disclosure. As shown in FIG. 6, the detection method includes the following steps:

in step S602, synchronization signals are detected and synchronization is implemented;

in step S604, locations of transmission resources of first-class signaling messages associated with the synchronization signals are determined according to the synchronization signals; and in step S606, the first-class signaling messages are received on the locations of the resources.

Alternatively, the first-class signaling messages include at least one of the following: a configuration message of a system parameter, or a configuration message of a broadcast parameter, or a configuration message of a multicast parameter, a physical layer control message indicating a physical layer transport configuration of the system parameter, a signaling configuration message transmitted in a physical broadcast or multicast channel, and a signaling configuration message transmitted in a physical control channel, wherein the signaling configuration message includes a common control message and a specialized control message.

Alternatively, an association relationship between the synchronization signals and the first-class signaling messages includes:

a reference demodulation relationship between transport of the first-class signaling messages and transport of the synchronization signals;

a correspondence relationship between the transport of the first-class signaling messages and the transport of the synchronization signals and one of the following: transmission beams, reception beams, virtual sectors, ports, antennas and transport nodes;

a quasi-co-location relationship between a transmission signal of the first-class signaling messages and a transmission signal of the synchronization signals; and an association relationship between a scrambling manner of the first-class signaling messages and resource locations used to transmit the synchronization signals, wherein the resource location includes at least one of the following: sequences, sequence locations, beams, sectors, antennas and ports.

Alternatively, that locations of transmission resources of first-class signaling messages associated with the synchronization signals are determined according to the synchronization signals includes one of the following:

the locations of the transmission resources of the first-class signaling messages are in the same time-domain symbols as the synchronization signals bound thereto;

the locations of the transmission resources of the first-class signaling messages are in the same time-domain symbols as the synchronization signals bound thereto and X1 time-domain symbols behind the synchronization signals bound thereto, wherein the X1 time-domain symbols are consecutive time-domain symbols;

the locations of the transmission resources of the first-class signaling messages are in the same time-domain symbols as the synchronization signals bound thereto and X2 time-domain symbols preceding the synchronization signals bound thereto, wherein the X2 time-domain symbols are consecutive time-domain symbols;

the locations of the transmission resources of the first-class signaling messages are in the same time-domain symbols as the synchronization signals bound thereto and X1 time-domain symbols behind the synchronization signals bound thereto as well as X2 time-domain symbols preceding the synchronization signals bound thereto, wherein the X1 time-domain symbols and the X2 time-domain symbols are consecutive time-domain symbols; and the locations of the transmission resources of the first-class signaling messages are in Y1 time-domain symbols behind or preceding the synchronization signals bound thereto. Particularly, when the locations of the transmission resources of the first-class signaling messages are in Y1 time-domain symbols behind or preceding the synchronization signals bound thereto, at least one of the following is also included: locations of the Y1 time-domain symbols are determined according to a resource index of the bound synchronization signals; and the locations of the Y1 time-domain symbols are adjacent to the bound synchronization signals.

Alternatively, the synchronization signals are also used to indicate mapping information of the first-class signaling messages, wherein the mapping information includes bandwidths, locations and multiplexing manners.

Alternatively, a scrambling code of the first-class signaling messages is determined according to a resource index used by the synchronization signals associated with the first-class signaling messages.

Figure 7:
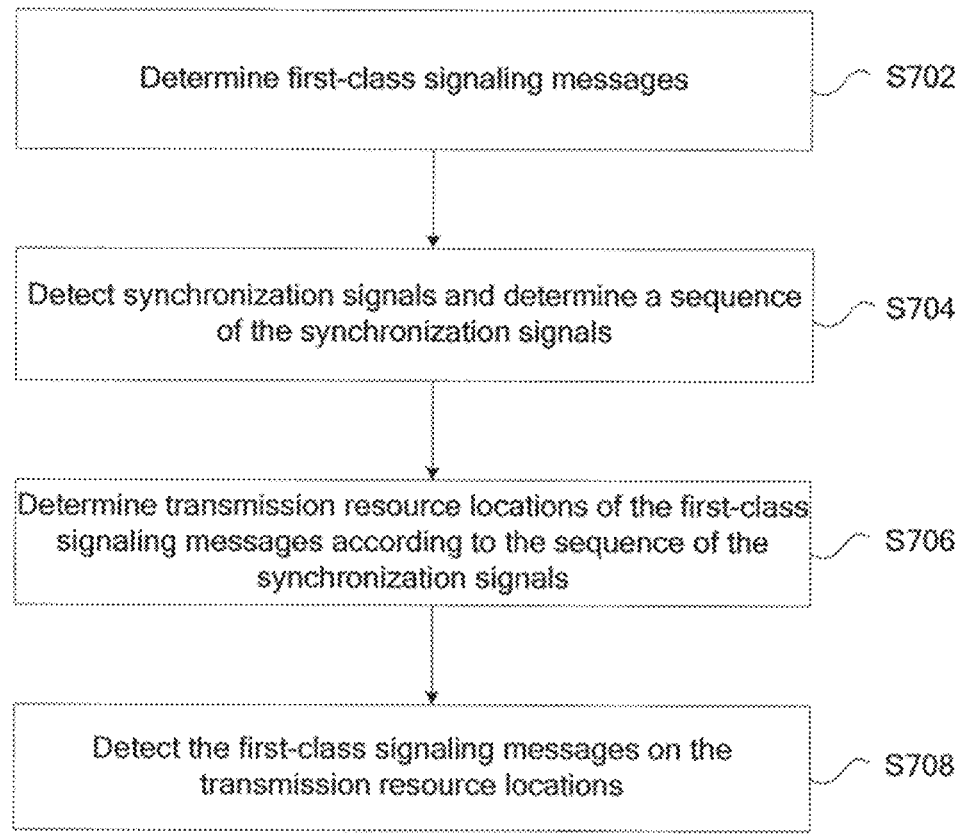
FIG. 7 is a flowchart of another detection method of signaling messages according to an embodiment of the present disclosure.

Further detection method of signaling messages is provided in this embodiment, and FIG. 7 is a flowchart of another detection method of signaling messages according to an embodiment of the present disclosure. As shown in FIG. 7, the detection method includes the following steps:

in step S702, first-class signaling messages are determined, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message;

in step S704, the synchronization signals are detected, and a sequence of the synchronization signals is determined;

in step S706, locations of transmission resources of the first-class signalings are determined according to the sequence of the synchronization signals; and in step S708, the first-class signaling messages are detected on the locations of the transmission resources.

By means of the description of the above embodiments, those skilled in the art may clearly understand that the method according to the above embodiment may be implemented by means of software plus a necessary general hardware platform, and certainly may be implemented by means of hardware, but in many cases, the former is a better implementation. Based on such an understanding, a portion of the technical solution of the present disclosure, which is essential or contributes to the prior art, may be embodied in the form of a software product stored in a storage medium (such as a ROM/RAM, a magnetic disk, an optical disk) and including a number of instructions for causing a terminal device (which may be a cell phone, a computer, a server, or a network device, and the like) to perform the methods described in various embodiments of the present disclosure.

A Second Embodiment

A transmission apparatus, a detection apparatus and a system of signaling messages are provided in this embodiment. The apparatuses are configured to implement the foregoing embodiments and preferred embodiments, which have already been described and therefore will be omitted. As used below, the term "module" may implement a combination of software and/or hardware with a predetermined function. Although the apparatuses described in the following embodiments are preferably implemented in software, hardware or a combination of software and hardware is also possible and contemplated.

This embodiment provides a transmission apparatus of signaling messages, which is applied to a transmission end and includes a first determination module, which is configured to determine N groups of synchronization signals and transmission resources corresponding to the N groups of synchronization signals, wherein N>=1; a second determination module, which is configured to determine M sets of first-class signaling messages associated with the N groups of synchronization signals, wherein M<=N; a third determination module, which is configured to determine locations of the transmission resources of the M sets of first-class signaling messages; and a transmission module, which is configured to respectively transmit the N groups of synchronization signals and the first-class signaling messages on the transmission resources and the locations of the transmission resources.

This embodiment provides another transmission apparatus of signaling messages, which is applied to a transmission end and includes a determination module, which is configured to determine first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; a grouping module, which is configured to classify the first-class signaling messages into at least two groups; and a transmission module, which is configured to transmit the grouped first-class signaling messages.

This embodiment provides yet another transmission apparatus of signaling messages, which is applied to a transmission end and includes a first determination module, which is configured to determine first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; a second determination module, which is configured to determine transmission resources of the first-class signaling messages; a transmission module, which is configured to transmit the first-class signaling messages on the transmission resources; and a processing module, which is configured to transmit synchronization signals and indicate transmission resources of the first-class signalings by a sequence of the synchronization signals, or configure the transmission resources of the first-class signalings by a signaling.

This embodiment provides a detection apparatus of signaling messages, which is applied to a reception end and includes a detection module, which is configured to detect synchronization signals and implement synchronization; a determination module, which is configured to determine locations of transmission resources of first-class signaling messages associated with the synchronization signals according to the synchronization signals; and a reception module, which is configured to receive the first-class signaling messages on the locations of the resources.

This embodiment provides further detection apparatus of signaling messages, which is applied to a reception end and includes a first determination module, which is configured to determine first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; a first detection module, which is configured to detect synchronization signals, and determine a sequence of the synchronization signals; a second determination module, which is configured to determine locations of transmission resources of the first-class signalings according to the sequence of the synchronization signals; and a second detection module, which is configured to detect the first-class signaling messages on the locations of the transmission resources.

Figure 8:
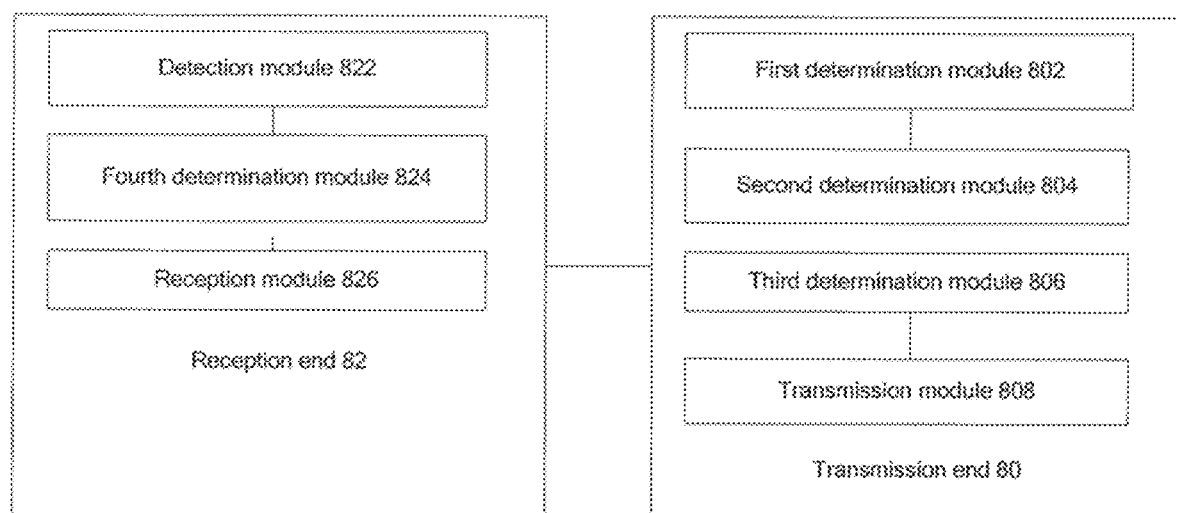
FIG. 8 is a block diagram showing a structure of a transmission system of signaling messages according to an embodiment of the present disclosure.

FIG. 8 is a block diagram showing a structure of a transmission system of signaling messages according to an embodiment of the present disclosure. As shown in FIG. 8, the system includes a transmission end 80 and a reception end 82, wherein the transmission end 80 includes a first determination module 802, which is configured to determine N groups of synchronization signals and transmission resources corresponding to the N groups of synchronization signals, wherein N>=1; a second determination module 804, which is configured to determine M sets of first-class signaling messages associated with the N groups of synchronization signals, wherein M<=N; a third determination module 806, which is configured to determine locations of the transmission resources of the M sets of first-class signaling messages; and a transmission module 808, which is configured to respectively transmit the N groups of synchronization signals and the first-class signaling messages on the transmission resources and the locations of the transmission resources; and the reception end 82 includes a detection module 822, which is configured to detect the synchronization signals and implement synchronization; a fourth determination module 824, which is configured to determine locations of the transmission resources of the first-class signaling messages associated with the synchronization signals according to the synchronization signals; and a reception module 826, which is configured to receive the first-class signaling messages on the locations of the resources.

Figure 9:
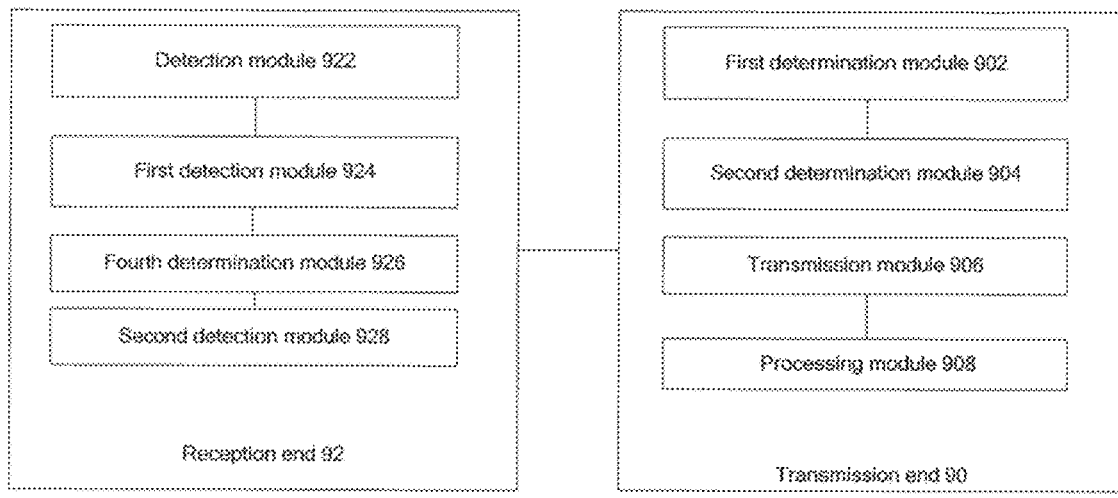
FIG. 9 is a block diagram showing a structure of another transmission system of signaling messages according to an embodiment of the present disclosure.

FIG. 9 is a block diagram showing a structure of another transmission system of signaling messages according to an embodiment of the present disclosure. As shown in FIG. 9, the system includes a transmission end 90 and a reception end 92, wherein the transmission end 90 includes a first determination module 902, which is configured to determine first-class signaling messages, wherein the first-class signaling messages include at least one of the following: a configuration message of a system parameter, or a configuration message of a broadcast parameter, or a configuration message of a multicast parameter, a physical layer control message indicating a physical layer transport configuration of the system parameter, or a physical layer control message indicating a physical layer transport configuration of the broadcast parameter, or a physical layer control message indicating a physical layer transport configuration of the multicast parameter, a signaling configuration message transmitted in a physical broadcast or multicast channel, a signaling configuration message transmitted in a physical control channel, wherein the signaling configuration message includes a common control message and a specialized control message; a second determination module 904, which is configured to determine transmission resources of the first-class signaling messages; a transmission module 906, which is configured to transmit the first-class signaling messages on the transmission resources; and a processing module 908, which is configured to transmit synchronization signals and indicate the transmission resources of the first-class signalings according to a sequence of the synchronization signals, or configure the transmission resources of the first-class signalings by a signaling; and the reception end 92 includes a third determination module 922, which is configured to determine the first-class signaling messages; a first detection module 924, which is configured to detect the synchronization signals, and determine a sequence of the synchronization signals; a fourth determination module 926, which is configured to determine locations of the transmission resources of the first-class signalings according to the sequence of the synchronization signals; and a second detection module 928, which is configured to detect the first-class signaling messages on the locations of the transmission resources.

It should be noted that the above modules may be implemented by software or hardware. For the latter, the foregoing may be implemented by the following manners including but not limited to, the foregoing modules are all located in the same processor; or the above modules are located in different processors in a form of any combination.

A Third Embodiment

This embodiment is an optional embodiment of the present disclosure, which is used to describe this application in detail according to a specific scenario. A manner in the related art of the present disclosure still uses a wide beam for transmission, which causes problems of coverage and efficiency of a broadcast channel. In addition, if some messages currently included in the broadcast channel and some newly added information have requirements intended for users of different ranges, such as some configuration messages intended for UE groups of different ranges, then there is a need for a new broadcast or multicast information transmission method. Embodiments include a number of specific embodiments.

A Specific Embodiment A

Figure 10:
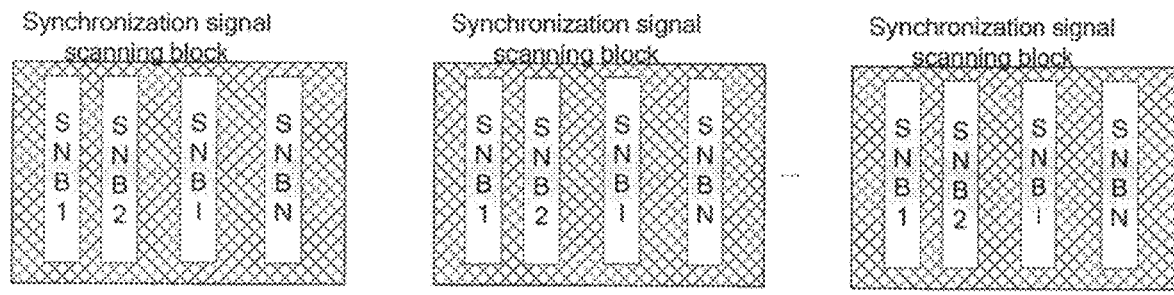
FIG. 10 is a schematic diagram of scanning of transmitting synchronization signals according to an embodiment of the present disclosure.

In a synchronous signal transmission mode based on radio-frequency beam scanning, FIG. 10 is a schematic diagram of scanning of transmitting synchronization signals according to an embodiment of the present disclosure. The synchronization signals (SN) are transmitted to corresponding directions by using different radio-frequency beams at different moments. Because it is necessary for the synchronization signals to generally guarantee full coverage, a scanning range is generally a coverage range of a cell; the narrower the beam is, the larger the gain is and the wider the coverage is, but the more scanning beams required are, the longer the corresponding time is.

This scanning mode is to simply give a single transmission channel; and for a case of radio-frequency beam time division, if there are multiple transmission channels, other beam multiplexing modes may also be performed.

It is necessary for a transmission end to determine N groups of synchronization signals and transmission resources corresponding to the N groups of synchronization signals; in general, the N groups of synchronization signals correspond to N different transmission resource configurations; for resource types, in addition to the aforementioned time-domain symbols and beam resources, the transmission resources may be antenna port resources or may be called antenna resources; frequency-domain resources; sequence resources and the like; for example, the synchronization signals transmitted by using different beams may be distinguished by using different antenna ports; the synchronization signals transmitted by using different beams may also be distinguished by using different frequency-domain resources; and the synchronization signals transmitted by using different beams may also be distinguished on different sequence resources.

In a downlink, a terminal needs to receive a lot of important information; these pieces of important information mainly include system parameters, such as some important configuration information, such as bandwidth configurations, frame structures, numerology parameters, access parameters, channel configurations, and the like, of a physical layer; in addition to some parameters in the traditional 4G, here should also include some physical layer configuration parameters that will be newly introduced in the 5G; the system message is not limited to the configuration information of the physical layer, and may also be the configuration information of a higher layer.

These parameters are generally transmitted on a physical layer broadcast channel (PBCH), or indicate transport locations on a physical layer control channel (PDCCH), and are transmitted in a physical layer data channel; it may be seen that information content itself is generally directly transmitted when these parameters are transmitted on the PBCH, if these parameters are transmitted on the control channel, one piece of transport indication information instead of the parameters themselves is transmitted; these messages are transmitted in a cell broadcast mode in the 4G, and may be transmitted in a cell broadcast or sector multicast mode in the 5G; and the multicast mode is only intended for a user group composed of some users instead of users in all cells.

For the above these pieces of information, we collectively refer to first-class signalings, and the first-class signalings mentioned in the present disclosure include:
- a configuration message of a system parameter/a broadcast parameter/a multicast parameter;
- a physical layer control message indicating a physical layer transport configuration of the system parameter;
- a signaling configuration message transmitted in a physical broadcast or multicast channel; and
- a signaling configuration message (CSS/USS) transmitted in a physical control channel.

How to transmit the first-class signalings is a problem that the present disclosure needs to solve; we propose some ways of the following ways to transmit the first-class signalings:

the first way is that a synchronization channel is associated and bound with a channel of transmitting the first-class signalings, and an association relationship here includes:
- there is a reference demodulation relationship between transport of some or all of the first-class signaling messages and transport of the synchronization signals;
- a correspondence relationship between the transport of the first-class signaling messages and the transport of the synchronization signals and (receive/transmit) beams/virtual sectors/ports/antennas/transport nodes; and
- a quasi-co-location relationship between a transmission signal of some or all of the first-class signaling messages and a transmission signal of the synchronization signals.

There is an association relationship between a scrambling mode of some or all of the first-class signaling messages and locations (sequences, locations, beams, sectors, antennas, ports, and the like) of the transmission resources used by the synchronization signals.

A Specific Embodiment A-1

The total transmission resource set corresponding to a channel of first-class signalings may be a larger resource set, such as S beams, or S sequences, or S virtual sectors, or S antennas, or S time-domain symbol groups, or S frequency-domain resource blocks, and the like, wherein S is an integer greater than 0.

However, in order to obtain better transmission efficiency, robustness, and configuration flexibility, the transmission granularity of the first-class signaling messages may be determined according to some modes. An example of the so-called division of the transmission granularity is Table 2, and Table 2 is a table of the division of the transmission granularity of the embodiment of the present disclosure.

TABLE 2

| Transmission granularity configuration | Total resources | per set of signaling transmission resources | Maximal number of sets of signalings which may be transmitted |
|---|---|---|---|
| 1 | S | $S_1$ | $M_n = S/S_1$ |
| 2 | S | $S_2$ | $M_n = S/S_2$ |
| ... | ... | ... | ... |
| n | S | $S_n$ | $M_n = S/S_n$ |

In general, $S_1, S_2 \ldots S_n$ may be exactly divisible by S. If it may not be exactly divisible, then the number of resources transmitted by a set of signalings is determined by modulo (Mod).

Different first-class signalings may have different transmission granularity configurations, corresponding to different "each set of signaling transmission resources" and "the maximal number of sets of signalings that may be transmitted".

Among them, a division mode may be based on a type of the first-class signaling messages;

A simple example is that for some basic system parameters, such as system bandwidth information, only one set of signalings may be transmitted, all beams transmit the same content; and for some other messages, such as a physical random access channel (PRACH for short) configuration, different configurations may be transmitted by different beams, that is, the transmission granularities of the same set of parameter information are different.

Another example is that x sets of first-class signaling messages directly informing the parameters are transmitted, wherein x>=1; and y sets of physical layer control messages indicating the physical layer transmission configurations of the parameters are transmitted, wherein y>x, that is, the number of the transmission resources (e.g. beams) of the first-class signaling messages directly informing the parameters is greater than the number of the transmission resources (e.g. beams) of the physical layer control messages indicating the physical layer transport configurations of the parameters.

Yet another example is that x sets of signaling configuration messages are transmitted in a physical broadcast or multicast channel, wherein x>=1; and y sets of signaling configuration messages are transmitted in a physical control channel, wherein y>x; that is, the number of the transmission resources (e.g. beams) of the first-class signaling messages directly informing the parameters is greater than the number of the transmission resources (e.g. beams) of the physical layer control messages indicating the physical layer transport configurations of the parameters.

In addition to some examples mentioned above, more detailed granularity division may be performed according to a specific type of the first-class signaling messages, so that the transport efficiency is relatively high, such as an example given in Table 3 below. Table 3 is a table of performing division according to a type of first-class signaling messages according to an embodiment of the present disclosure.

TABLE 3

| Type of first signaling messages | Transmission granularity configuration |
|---|---|
| A | 1 |
| B | 2 |
| ... | ... |
| H | n |

Figure 11:
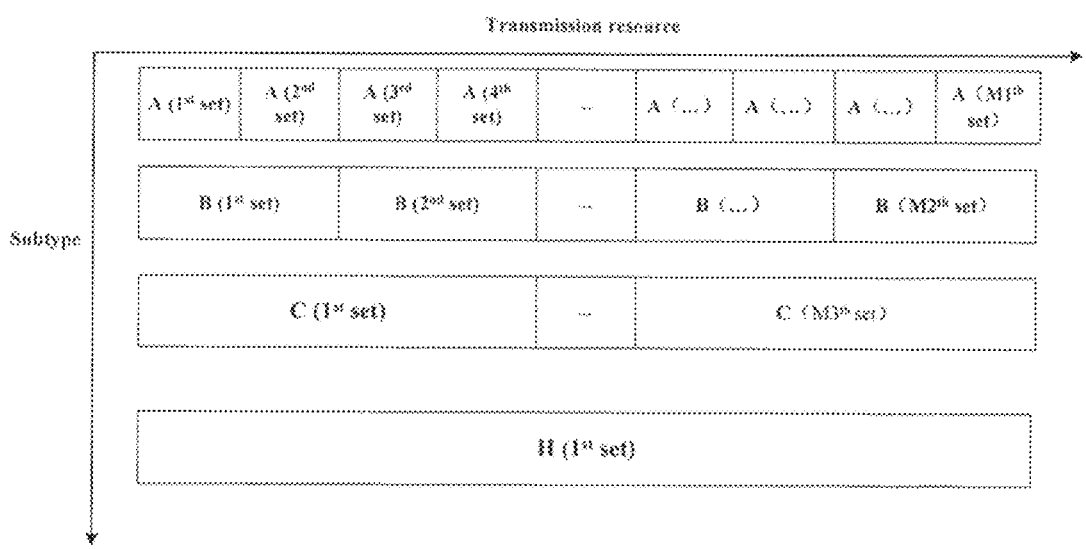
FIG. 11 is a schematic diagram showing that different first-class message subtypes correspond to different transmission resources and transmission parameter sets according to an embodiment of the present disclosure.

The types A, B . . . H of the first signaling messages may be various messages mentioned in the introduction of the prior art, and may also include some types newly introduced in the 5G. The granularity configuration may use all resources, and may use ½ resources, ¼ resources, and the like. The present disclosure focuses on a flexible granularity message transmission method. FIG. 11 is a schematic diagram showing that different first-class message subtypes correspond to different transmission resources and the number of sets of transmit parameters according to an embodiment of the present disclosure.

The transmission granularity of the first-class signalings of various different subtypes may be determined by characteristics of the subtypes, with different coverage ranges and oriented UE groups.

The above-mentioned way for pre-determining the transmission granularity is suitable for initially-accessed UE; the transmission granularity may also be configured by a signaling, and is more suitable for a case of non-initial access, such as a case of cell handover; the transmission granularity of the first-class signaling messages may be informed by performing some signaling configurations by a previous cell; and there is also a case where low frequency assists high frequency, and a low frequency cell enters a communication to obtain configuration information of the granularity, and then goes to the high frequency for performing synchronous access.

A transmission end may transmit, through other carrier frequencies/cells, configuration parameters indicating an association relationship between multiple types of first-class signaling messages and multiple groups of synchronization signals, for instance, indicating an association relationship between a certain subtype of first-class signaling messages and one synchronization signal or one group of synchronization signals, to a reception end, wherein if the configuration parameters indicates an association relationship between a certain subtype of first-class signaling messages and one group of synchronization signals, there is a need for informing the number of synchronization signals included in the one group of signals.

A scrambling code of the first-class signaling messages may be determined according to a resource index used by the synchronization signals bound thereto; when the first-class signalings are scrambled, one scrambling code may be used, and when the scrambling code is initialized, there may be an initialization parameter, which may be determined by the resource index used by the synchronization signals bound to the first-class signaling messages.

A Specific Embodiment A-2

This embodiment is used to describe a relationship between locations of transmission resources of M sets of first type signaling messages involved in the embodiment A and locations of transmission resources of synchronization signals associated with the first-class signaling messages.

In general, frequency division and/or time division are/is performed on the transmission resources of the first-class signaling messages and the transmission resources of the synchronization signals associated with the first-class signaling messages, particularly, there are the following modes.

Figure 12:
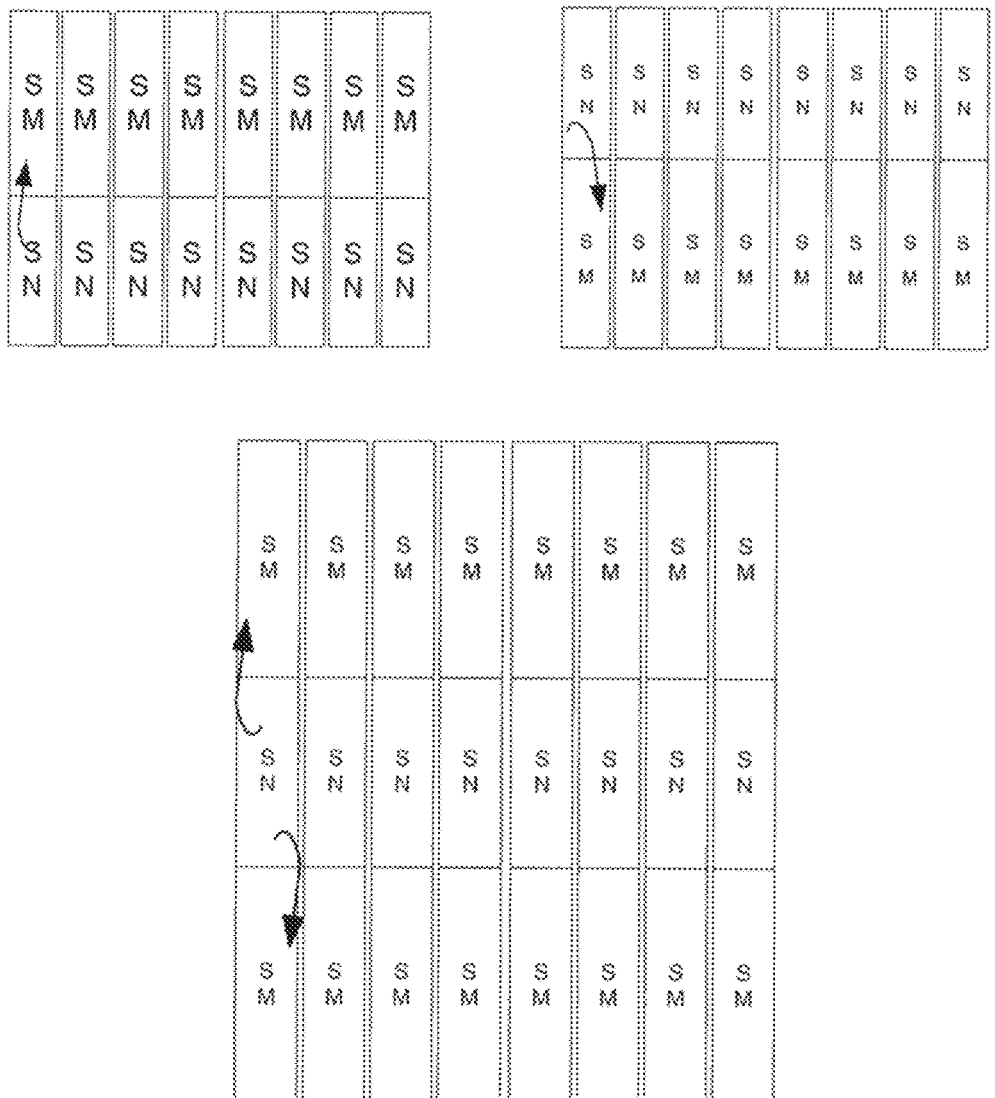
FIG. 12 is a schematic diagram of association between first-class signaling messages and synchronization signals according to an embodiment of the present disclosure.

The first mode: locations of transmission resources of the first-class signaling messages are in the same time-domain symbols as the synchronization signals bound thereto. FIG. 12 is a schematic diagram of association between first-class signaling messages and synchronization signals according to an embodiment of the present disclosure, as shown in FIG. 12, two specific examples are given, wherein a dimension corresponding to a horizontal axis is a time domain, such as an OFDM symbol, and a dimension corresponding to the vertical axis is a frequency domain, such as a subcarrier; and as shown in FIG. 12, a dimension corresponding to a horizontal axis is a time domain, such as an orthogonal frequency division multiplexing (OFDM) symbol, and a dimension corresponding to a vertical axis is a frequency domain, such as a subcarrier.

The first-class signaling messages are in the same OFDM symbols as the synchronization signals, and are subjected to frequency division with the synchronization signals. Specifically, there are several cases, which respectively correspond to three pictures of FIG. 12, and there are two cases on one side of the synchronization signals, there are two cases on both sides of the synchronization signals; and preferably, the first-class signaling messages here should be adjacent to the synchronization signals.

Figure 13:
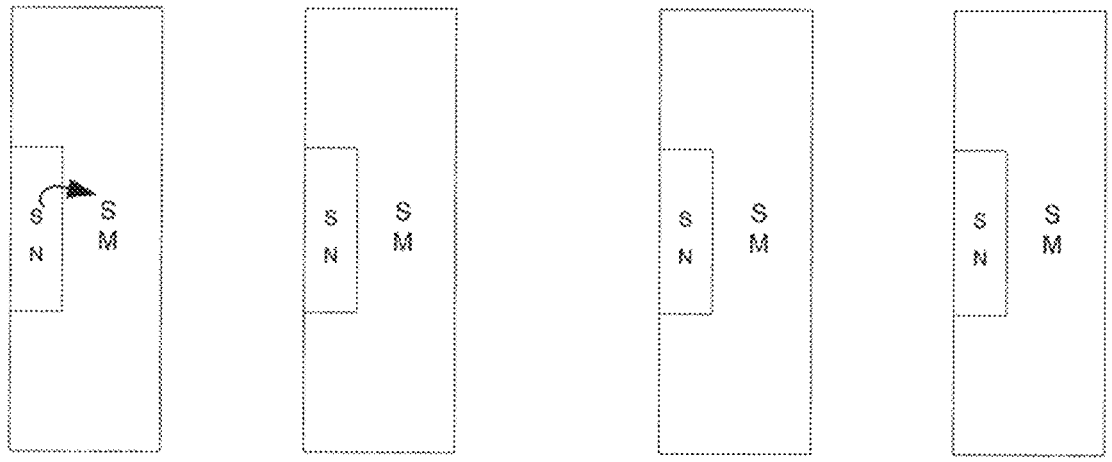
FIG. 13 is a first diagram showing a relationship between locations of transmission resources of first-class signaling messages and synchronization signals in a time domain according to an embodiment of the present disclosure.

The second mode: locations of transmission resources of the first-class signaling messages are in the same time-domain symbols as the synchronization signals bound thereto and X1 time-domain symbols behind the synchronization signals bound thereto; and preferably, the X1 time-domain symbols are consecutive time-domain symbols. FIG. 13 is a first diagram showing a relationship between locations of transmission resources of first-class signaling messages and synchronization signals in a time domain according to an embodiment of the present disclosure. As shown in FIG. 13, it is a typical example, wherein a dimension corresponding to a horizontal axis is a time domain, such as an OFDM symbol, and a dimension corresponding to a vertical axis is a frequency domain, such as a subcarrier.

In addition to this, a symbol in which the synchronization signals for transmitting the first-class signaling messages and the synchronization signals are located may have a smaller bandwidth than that of a subsequent symbol for transmitting the first-class signaling messages.

Figure 14:
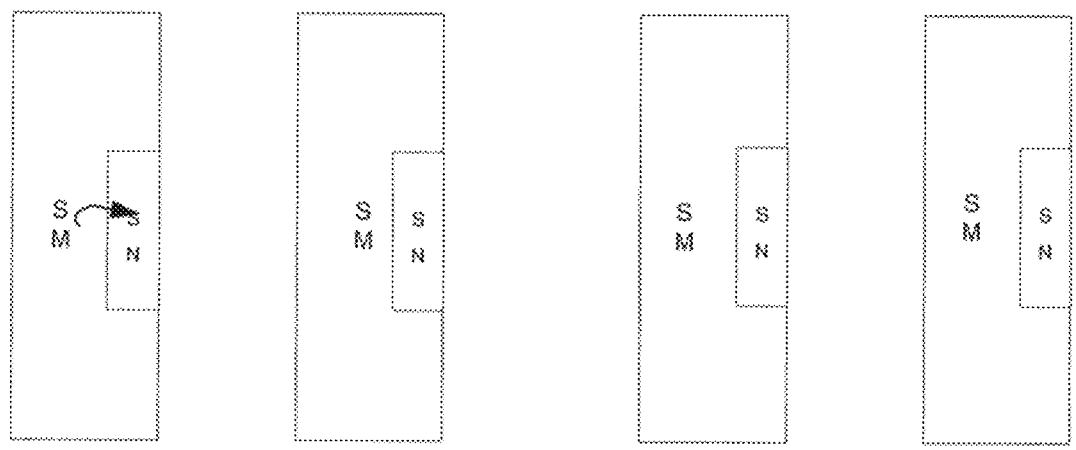
FIG. 14 is a second diagram showing a relationship between locations of transmission resources of first-class signaling messages and synchronization signals in a time domain according to an embodiment of the present disclosure.

The third mode: locations of transmission resources of the first-class signaling messages are in the same time-domain symbols as the synchronization signals bound thereto and $X_2$ time-domain symbols preceding the synchronization signals bound thereto; furthermore, the $X_2$ time-domain symbols are consecutive time-domain symbols. FIG. 14 is a second diagram showing a relationship between locations of transmission resources of first-class signaling messages and synchronization signals in a time domain according to an embodiment of the present disclosure. A typical example is shown in FIG. 14, wherein a dimension corresponding to a horizontal axis is a time domain, such as an OFDM symbol, and a dimension corresponding to a vertical axis is a frequency domain, such as a subcarrier.

Figure 15:
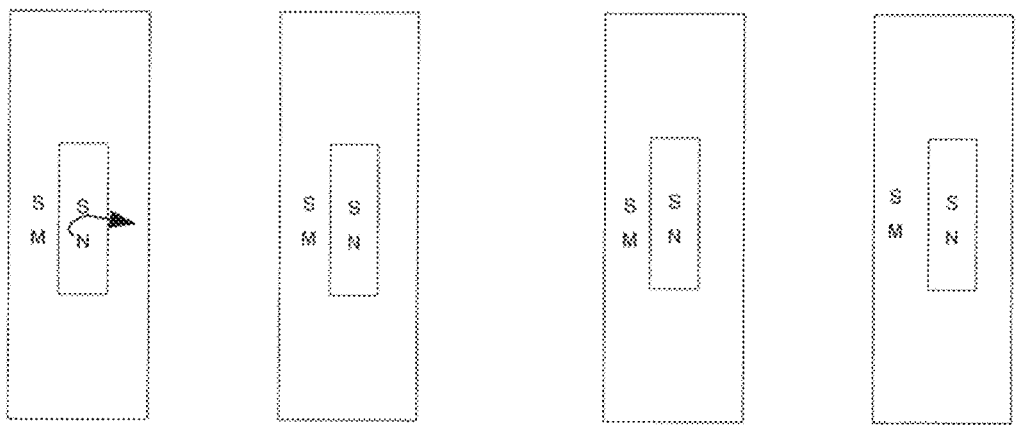
FIG. 15 is a third diagram showing a relationship between locations of transmission resources of first-class signaling messages and synchronization signals in a time domain according to an embodiment of the present disclosure.

The fourth mode: locations of transmission resources of the first-class signaling messages are in the same time-domain symbols as the synchronization signals bound thereto and $X_1$ time-domain symbols behind the synchronization signals bound thereto and $X_2$ time domain symbols preceding the synchronization signals bound thereto. Furthermore, the $X_1$ time-domain symbols and the $X_2$ time-domain symbols are consecutive time-domain symbols. FIG. 15 is a third diagram showing a relationship between locations of transmission resources of first-class signaling messages and synchronization signals in a time domain according to an embodiment of the present disclosure. A typical example is shown in FIG. 15, wherein a dimension corresponding to a horizontal axis is a time domain, such as an OFDM symbol, and a dimension corresponding to a vertical axis is a frequency domain, such as a subcarrier.

Figure 16:
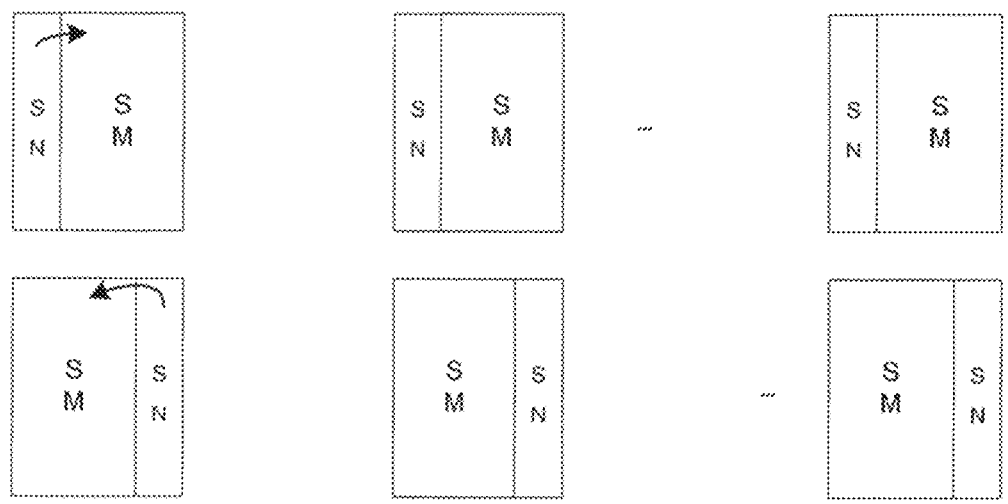
FIG. 16 is a fourth diagram showing a relationship between locations of transmission resources of first-class signaling messages and synchronization signals in a time domain according to an embodiment of the present disclosure.

The fifth mode: locations of transmission resources of first-class signaling messages are in a $Y_1$ time-domain symbol behind or preceding the synchronization signals bound thereto; wherein a dimension corresponding to a horizontal axis is a time domain, such as an OFDM symbol, and a dimension corresponding to a vertical axis is a frequency domain, such as a subcarrier. FIG. 16 is a fourth diagram showing a relationship between locations of transmission resources of first-class signaling messages and synchronization signals in a time domain according to an embodiment of the present disclosure.

Preferably, locations of the $Y_1$ time-domain symbols are adjacent to the synchronization signals bound thereto.

Figure 17:
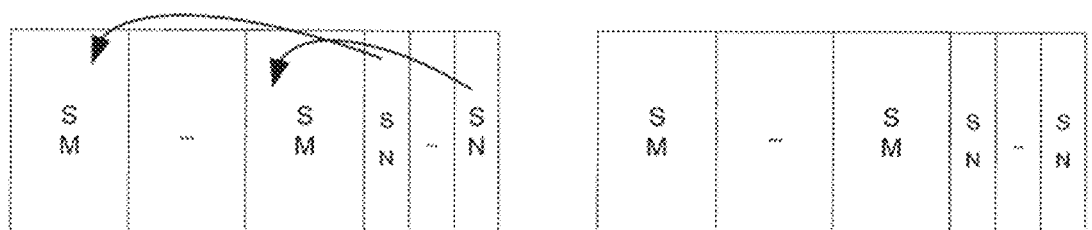
FIG. 17 is a fifth diagram showing a relationship between locations of transmission resources of first-class signaling messages and synchronization signals in a time domain according to an embodiment of the present disclosure.

However, there may be a case where the symbols are not adjacent to the synchronization signals. FIG. 17 is a fifth diagram showing a relationship between locations of transmission resources of first-class signaling messages and synchronization signals in a time domain according to an embodiment of the present disclosure.

For the latter two cases, the locations of the $Y_1$ time-domain symbols are determined according to a resource index of the synchronization signals thereto; and because the synchronization signals of different indexes are not exactly the same as the interval duration of the first-class signaling messages, the interval duration needs to be determined according to the index and the number of OFDM symbols occupied by the first-class signaling messages.

The transmission end may indicate mapping information of the first-class signaling messages by using the synchronization signals, wherein the mapping information includes information such as bandwidths/locations/multiplexing modes; and the transmission end may indicate the mapping information by the locations of the synchronization signals, the sequence used, or information contents carried in the synchronization signals.

After determining the synchronization signals and the transmission resources of the first-class signalings, the transmission end transmits first-class information and the synchronization signals on the locations of the resources.

A Specific Embodiment A-3

Figure 18:
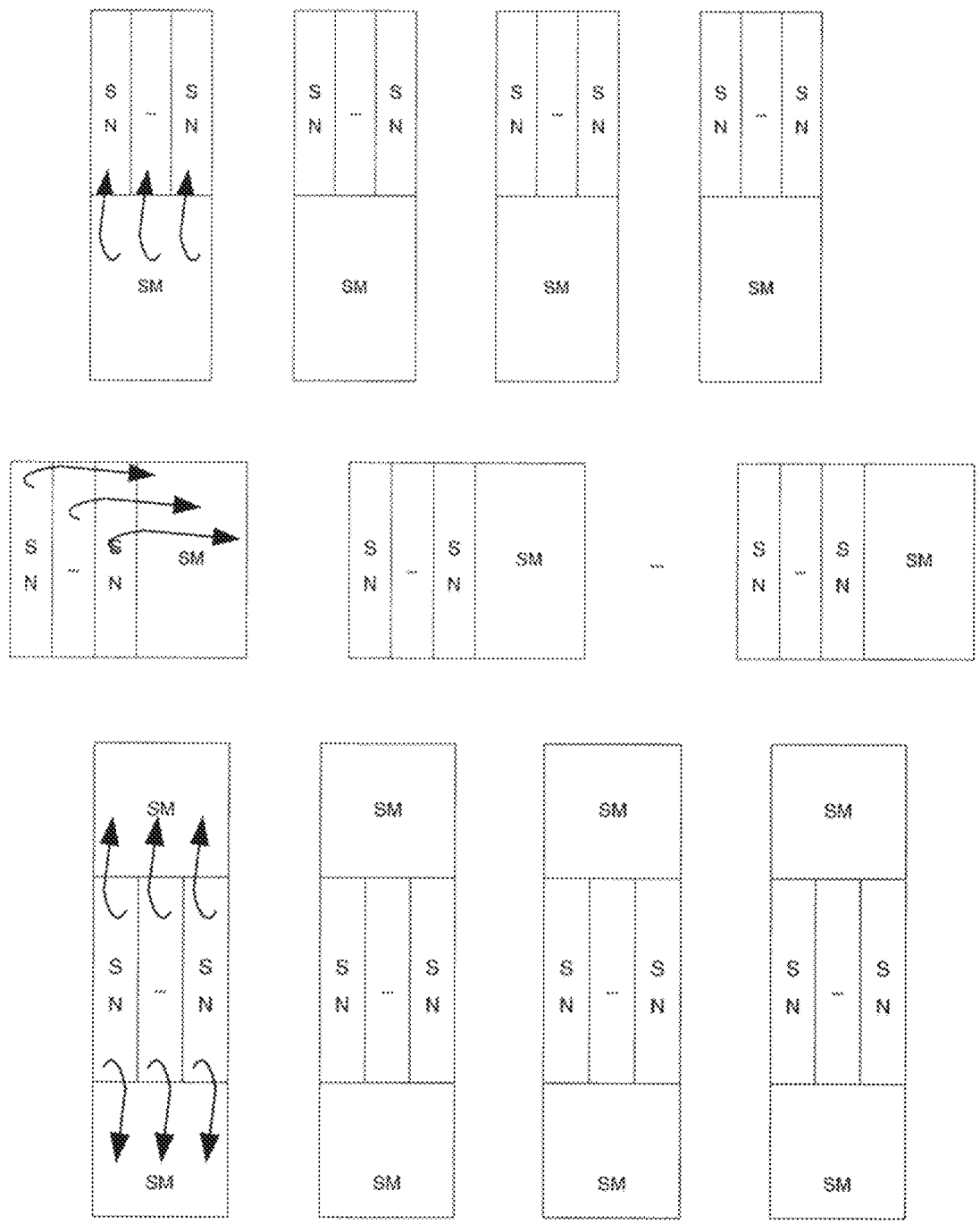
FIG. 18 is a schematic diagram showing a binding relationship between one set of first-class signaling messages and multiple synchronization signals according to an embodiment of the present disclosure.

In addition to some cases mentioned above, there may be a binding relationship between a set of first-class signaling messages and a plurality of synchronization signals below. FIG. 18 is a schematic diagram showing a binding relationship between a set of first-class signaling messages and a plurality of synchronization signals according to an embodiment of the present disclosure. As shown in FIG. 18, a dimension corresponding to a horizontal axis is a time domain, such as an OFDM symbol, and a dimension corresponding to a vertical axis is a frequency domain, such as a subcarrier.

A Specific Embodiment B

A base station of a transmission end firstly determines some first-class signaling messages that need to be transmitted; these first-class signaling messages have been introduced in the foregoing embodiment A, and include one or more of the following information: a configuration message of a system parameter/a broadcast parameter/a multicast parameter, a physical layer control message indicating a physical layer transport configuration of the system parameter/the broadcast parameter/the multicast parameter, a signaling configuration message transmitted in a physical broadcast or multicast channel, a signaling configuration message (CSS/USS) in a physical control channel; and the first-class signaling messages involved in this embodiment are the same as before.

The base station needs to transmit multiple first-class information messages. Preferably, the base station may classify the multiple first-class signaling messages into multiple groups. Generally, there are at least two groups, that is, the number of the groups is greater than or equal to 2.

A grouping method may be a mode in which a transmission end and a reception end perform an agreement. For instance, a protocol specifies which first-class signaling messages are classified into a first group, which second-class signaling messages are classified into a second group, and the like.

A grouping method may be based on a type of the first-class signaling messages, for instance, the signaling messages whose importance degrees are close are classified into the same group.

A grouping method may be based on a period of the first-class signaling messages, for instance, the messages with the same or approximate frequency are classified into the same group.

The grouping method may be based on an overhead size of the first-class signaling messages, for instance, the messages with similar overheads are classified into the same group.

Here, two groups are taken as an example to illustrate the transmission of multiple groups of first-class signaling messages, and the more groups may be done in the same manner.

The base station transmits multiple groups of first-class signaling messages, and there may be a transmission method of at least two groups of first-class signaling messages, including:

the first group of messages is transmitted on a first-class channel, wherein transmit bandwidths of the first-class channel are agreed by the transmission end or the reception end; configuration information of transport parameters of the second-class channel are transmitted on the first-class channel; and the second group of messages is transmitted on a second-class channel.

More specific configuration information of the transport parameters includes one or more of the following:

a transmitting port of the second-class channel: for instance, how many ports are used by the second-class channel, specifically, which ports, location information of the transmitting port, and the like;

a transmit antenna configuration of the second-class channel: for instance, which antennas are used for transmission by the second-class channel, an antenna topology, an architecture, and other information;

a transmission sector configuration of the second-class channel: for instance, which transmission sectors are used for transmission by the second-class channel, number and sector ID;

a transmission beam configuration of the second-class channel: for instance, which transmission beams are used for transmission by the second class of channels, number and beam ID, beam weight and other information;

a transmission technique configuration of the second-class channel: for instance, whether a precoding technique or a diversity technique is used;

a time-domain resource size/location configuration of the second-class channel; for instance, how many OFDM symbols are used, and specifically which OFDM symbols are used;

a frequency-domain resource size/location configuration of the second-class channel; for instance, how many sub-carriers are used, and specifically which subcarriers are used;

a power configuration of the second-class channel; for instance, its transmit power is offset relative to a transmit power of the synchronization signals; or its transmit power is offset relative to a transmit power of its reference demodulation pilot; or a value of its transmit power is directly reported; and a corresponding pilot configuration of the second-class channel; for instance, information about the location of the reference demodulation pilot, density, power, the number of ports, a multiplexing relationship with other signals and other information.

Figure 19:
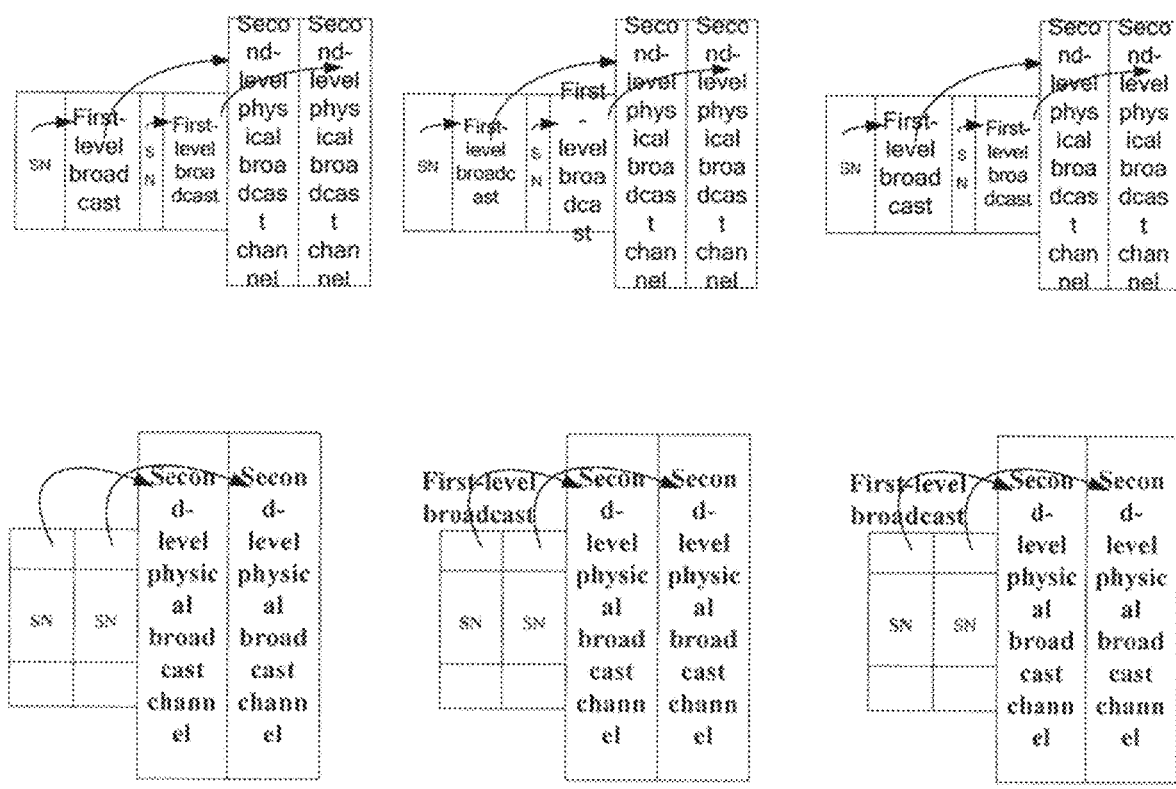
FIG. 19 is a schematic diagram of a time-frequency resource mapping configuration of a second-class channel according to an embodiment of the present disclosure.

A time-frequency resource mapping configuration of the second-class channel may also be included;

Preferably, the first-class channel is a first physical broadcast or multicast channel, and the second-class channel is a second physical broadcast or multicast channel. FIG. 19 is a schematic diagram of a time-frequency resource mapping configuration of a second-class channel according to an embodiment of the present disclosure. Two cases are given in FIG. 19.

FIG. 19 shows only two manners, and except for the previous manner as shown in FIG. 19, another preferred manner is that the first-class channel is a physical broadcast or multicast channel, and the second-class channel is a public control channel.

Considering that the information carried by the first-class channel needs to be detected at the reception end for a period of time, if the first-class channel carries the configuration information of the second-class channel, before the information carried by the first-class channel is detected, the information may not be correctly received and detected by the second-class channel, so that there is a need for reserving a certain time. Therefore, there is at least one time interval Ts between the first-class channel and the second-class channel, Ts may be in an absolute time unit, for example, a millisecond, a nanosecond and the like, or may be in the number of OFDM symbols.

In order to fully utilize the resources and to ensure that the time interval is sufficient, it is preferable to transmit the synchronization signals or other first-class channels within the interval as previously shown in FIG. 19.

A Specific Embodiment C

A base station of a transmission end firstly determines some first-class signaling messages that need to be transmitted; these first-class signaling messages have been introduced in the foregoing embodiment A, and include one or more of the following information: a configuration message of a system parameter/a broadcast parameter/a multicast parameter, a physical layer control message indicating a physical layer transport configuration of the system parameter/the broadcast parameter/the multicast parameter, a signaling configuration message transmitted in a physical broadcast or multicast channel, a signaling configuration message (CSS/USS) in a physical control channel; and the first-class signaling messages involved in this embodiment are the same as before.

The base station needs to determine transmission resource of the first-class signaling messages. There may be a plurality of candidate locations for the transmission resources of the first-class signaling messages for selection, for instance:

the first mode: locations of the transmission resources of the first-class signaling messages are in the same time-domain symbols as the synchronization signals bound thereto;

the second mode: locations of the transmission resources of the first-class signaling messages are in the same time-domain symbols as the synchronization signals bound thereto and X1 time-domain symbols behind the synchronization signals bound thereto;

the third mode: locations of the transmission resources of the first-class signaling messages are in the same time-domain symbols as the synchronization signals bound thereto and $X_2$ time-domain symbols preceding the synchronization signals bound thereto;

the fourth mode: locations of the transmission resources of the first-class signaling messages are in the same time-domain symbols as the synchronization signals bound thereto and $X_1$ time-domain symbols behind the synchronization signals bound thereto as well as $X_2$ time-domain symbols preceding the synchronization signals bound thereto; and the fifth mode: locations of the transmission resources of the first-class signaling messages are in Y1 time-domain symbols behind or preceding the synchronization signals bound thereto.

The base station may determine a mode according to the bandwidth, the total transmit power, and the coverage requirement, and then indicate a mode by the information carried by a sequence of the synchronization signals.

The reception end may determine locations of transmit video resources of the first-class signaling messages according to an indication of the sequence of the synchronization signals, and perform correct detection and reception.

In addition to this, the sequence of the synchronization signals may also inform frequency-domain locations, time-domain locations, and the like transmitted by some other first-class signaling messages; and may also indicate multiple types of transmit locations in first-class signalings respectively.

A Specific Embodiment D

A base station of a transmitting firstly determines some first-class signaling messages that need to be transmitted; these first-class signaling messages have been introduced in the foregoing embodiment A, and include one or more of the following information: a configuration message of a system parameter/a broadcast parameter/a multicast parameter, a physical layer control message indicating a physical layer transport configuration of the system parameter/the broadcast parameter/the multicast parameter, a signaling configuration message transmitted in a physical broadcast or multicast channel, a signaling configuration message (CSS/USS) in a physical control channel; and the first-class signaling messages involved in this embodiment are the same as before.

The first-class signaling messages are classified into X groups, wherein X>=2; the grouping method is agreed by the transmission end and the reception end; the first-class signaling messages may be grouped according to a type of the first-class signaling messages; or grouped according to a transmission period of the first-class signaling messages, as shown in Table 4; or grouped according to an overhead size of the first-class signaling messages, as shown in Table 5 and Table 6.

TABLE 4

| First signaling message group | Period |
|---|---|
| Group A | Configuration 1 |
| Group B | Configuration 2 |
| ... | ... |
| Group H | Configuration n |

TABLE 5

| First signaling message group | Overhead |
|---|---|
| Group A | Belonging to a range 1 |
| Group B | Belonging to a range 2 |
| ... | ... |
| Group H | Belonging to a range n |

TABLE 6

| First signaling message group | Overhead |
|---|---|
| Group A | Belonging to a type set 1 |
| Group B | Belonging to a type set 2 |
| ... | ... |
| Group H | Belonging to a type set n |

Another way is that the base station directly informs a terminal after grouping, without agreeing a grouping rule.

The base station needs to determine transmission resources of the first-class signaling messages, such as beams (Table 7), ports, the number of sectors (Table 9), and port and beam combinations (Table 8).

TABLE 7

| First signaling message group | Transmission resource |
|---|---|
| Group A | Beam set 1 |
| Group B | Beam set 2 |
| ... | ... |
| Group H | Beam set n |

TABLE 8

| First signaling message group | Transmission resource |
|---|---|
| Group A | Port 1, beam set 1 |
| Group B | Port 2, beam set 1 |
| Group C | Port 1, beam set 2 |
| Group D | Port 2, beam set 2 |
| ... | ... |
| Group G | Port 1, beam set n |
| Group G | Port 2, beam set n |

TABLE 9

| First signaling message group | Transmission resource |
|---|---|
| Group A | Sector set 1 |
| Group B | Sector set 2 |
| ... | ... |
| Group H | Sector set n |

The base station needs to determine the transmission resources of the first-class signaling messages, such as time-frequency resource locations, wherein the frequency-domain resources are as shown in Table 10, the time-domain resources are as shown in Table 11, and the time-frequency resources are as shown in Table 12.

TABLE 10

| First signaling message group | Transmission resource |
|---|---|
| Group A | Frequency-domain resource set 1 |
| Group B | Frequency-domain resource set 2 |
| ... | ... |
| Group H | Frequency-domain resource set n |

TABLE 11

| First signaling message group | Transmission resource |
|---|---|
| Group A | Time-domain resource set 1 |
| Group B | Time-domain resource set 2 |
| ... | ... |
| Group H | Time-domain resource set n |

TABLE 12

| First signaling message group | Transmission resource |
|---|---|
| Group A | Time-frequency resource set 1 |
| Group B | Time-frequency resource set 2 |
| ... | ... |
| Group H | Time-frequency resource set n |

The base station transmits the first-class signaling messages on the transmission resources determined above.

Correspondingly, the terminal determines, according to a configuration message of the base station or an agreed rule, a packet to which the first-class signaling messages to be detected belong, and then determines the number of the transmission beams/ports/sectors used according to the group to which the first-class signaling messages belong, or determines a size of the time-frequency resources used according to the group to which the first-class signaling messages belong, or determines a configuration of a reference demodulation signal according to the group to which the first-class signaling messages belong.

The terminal performs detection on the transmission resources that determine the first-class signalings, and obtains the first-class signaling messages.

A Fourth Embodiment

Embodiments of the present disclosure further provide a storage medium. Alternatively, in this embodiment, the foregoing storage medium may be configured to store a program code for performing the following steps:

S1, N groups of synchronization signals and transmission resources corresponding to the N groups of synchronization signals are determined, wherein N>=1;

S2, M sets of first-class signaling messages associated with the N groups of synchronization signals are determined, wherein M<=N;

S3, locations of the transmission resources of the M sets of first-class signaling messages are determined; and S4, the N groups of synchronization signals and the first-class signaling messages are respectively transmitted on the transmission resources and the locations of the transmission resources.

Alternatively, in this embodiment, the foregoing storage medium may include, but not limited to, a USB flash drive, a read-only memory (ROM), a random access memory (RAM), a mobile hard disk, a magnetic disk or an optical disk and other media that may store the program code.

Alternatively, in this embodiment, a processor performs, according to the program code which has been stored in the storage medium, determination of N groups of synchronization signals and transmission resources corresponding to the N groups of synchronization signals, wherein N>=1.

Alternatively, in this embodiment, a processor performs, according to the program code which has been stored in the storage medium, determination of M sets of first-class signaling messages associated with the N groups of synchronization signals, wherein M<=N.

Alternatively, in this embodiment, a processor performs, according to the program code which has been stored in the storage medium, determination of locations of the transmission resources of the M sets of first-class signaling messages.

Alternatively, in this embodiment, a processor performs, according to the program code which has been stored in the storage medium, respective transmission of the N groups of synchronization signals and the first-class signaling messages on the transmission resources and the locations of the transmission resources.

Alternatively, a specific example in this embodiment may refer to the examples described in the foregoing embodiments and the alternative embodiments, and this embodiment will be omitted herein.

Obviously, it will be apparent to those skilled in the art that various modules or steps of the present disclosure described above may be implemented by a general-purpose computing apparatus, may be centralized on a single computing apparatus or distributed across a network composed of multiple computing apparatuses. Alternatively, they may be implemented by the program code executable by the computing apparatus, such that they may be stored in a storage apparatus and performed by the computing apparatus, and in some cases, the shown or described steps may be performed in an order different from the order herein, or they are separately fabricated as individual integrated circuit modules, or a plurality of modules or steps thereof are fabricated as a single integrated circuit module. In this way, the present disclosure is not limited to any specific combination of hardware and software.

The above description is only a preferred embodiment of the present disclosure, and is not intended to limit the present disclosure, and various modifications and changes may be made to the present disclosure. Any modifications, equivalent substitutions, improvements, and the like made within the spirit and scope of the present disclosure are intended to be included within the scope of the present disclosure.

INDUSTRIAL APPLICABILITY

According to the embodiment of the present disclosure, N groups of synchronization signals and transmission resources corresponding to the N groups of synchronization signals are determined, wherein N>=1; M sets of first-class signaling messages associated with the N groups of synchronization signals are determined, wherein M<=N; and the N groups of synchronization signals and the first-class signaling messages are respectively transmitted on the transmission resources and the locations of the transmission resources. By means of the present disclosure, the problems of coverage and efficiency of a broadcast channel which are caused during wide beam transmission in the related art are solved. Needs of users of different ranges may be met.

What is claimed is:

1. A method for detecting signaling messages, comprising:
receiving synchronization signals sent by a base station and detecting a sequence of the synchronization signals to implement synchronization with the base station;
determining transmission resource locations of first-class signaling messages associated with the synchronization signals according to the synchronization signals; and
receiving the first-class signaling messages on the transmission resource locations;
wherein the determining the transmission resource locations of the first-class signaling messages associated with the synchronization signals according to the synchronization signals comprises one of the following:
the transmission resource locations of the first-class signaling messages are in time-domain symbols same as the time-domain symbols of the synchronization signals bound to the first-class signaling messages;

the transmission resource locations of the first-class signaling messages are in the time-domain symbols same as the time-domain symbols of the synchronization signals bound to the first-class signaling messages, and X1 time-domain symbols behind the synchronization signals bound to the first-class signaling messages, wherein the X1 time-domain symbols are consecutive time-domain symbols;

the transmission resource locations of the first-class signaling messages are in the time-domain symbols same as the time-domain symbols of the synchronization signals bound to the first-class signaling messages, and X2 time-domain symbols preceding the synchronization signals bound to the first-class signaling messages, wherein the X2 time-domain symbols are consecutive time-domain symbols;

the transmission resource locations of the first-class signaling messages are in the time-domain symbols same as the time-domain symbols of the synchronization signals bound to the first-class signaling messages, and X1 time-domain symbols behind the synchronization signals bound to the first-class signaling messages as well as X2 time-domain symbols preceding the synchronization signals bound to the first-class signaling messages, wherein the X1 time-domain symbols and the X2 time-domain symbols are consecutive time-domain symbols; and the transmission resource locations of the first-class signaling messages are in Y1 time-domain symbols behind or preceding the synchronization signals bound to the first-class signaling messages.

2. The method according to claim 1, wherein the first-class signaling messages comprise at least one of the following:
  a configuration message about a system parameter, or a configuration message about a broadcast parameter, or a configuration message about a multicast parameter;
  a physical layer control message indicating a physical layer transport configuration of the system parameter, or a physical layer control message indicating a physical layer transport configuration of the broadcast parameter, or a physical layer control message indicating a physical layer transport configuration of the multicast parameter;
  a signaling configuration message transmitted in a physical broadcast or multicast channel; or
  a signaling configuration message transmitted in a physical control channel, wherein the signaling configuration message transmitted in the physical control channel comprises a common control message and a specialized control message.

3. The method according to claim 1, wherein the synchronization signals and the first-class signaling messages are associated in the following manners:
  transmission of the first-class signaling messages and transmission of the synchronization signals meet a reference demodulation relationship;
  the transmission of the first-class signaling messages and the transmission of the synchronization signals correspond to a same one selected from transmission beams, reception beams, virtual sectors, ports, antennas and transport nodes;
  a transmission signal of the first-class signaling messages and a transmission signal of the synchronization signals meet a quasi-co-location relationship; and
  a scrambling manner of the first-class signaling messages is associated with resource locations used for transmitting the synchronization signals, wherein the resource locations comprise at least one of the following: sequences, sequence locations, beams, sectors, antennas and ports.

4. The method according to claim 1, wherein when the transmission resource locations of the first-class signaling messages are in Y1 time-domain symbols behind or preceding the synchronization signals bound to the first-class signaling messages, at least one of the following is also comprised:
  locations of the Y1 time-domain symbols are determined according to a resource index of the synchronization signals bound to the first-class signaling messages; and
  the Y1 time-domain symbols are adjacent to the synchronization signals bound to the first-class signaling messages.

5. The method according to claim 1, wherein the synchronization signals are further used for indicating mapping information about the first-class signaling messages, wherein the mapping information comprises a bandwidth, a location and a multiplexing manner.

6. The method according to claim 1, wherein a scrambling code of the first-class signaling messages is determined according to a resource index used by the synchronization signals associated with the first-class signaling messages.

7. An apparatus for detecting signaling messages, comprising:
  a processor;
  a memory for storing processor-executable instructions;
  wherein the processor is configured to:
  receive synchronization signals sent by a base station and detect a sequence of the synchronization signals to implement synchronization with the base station;
  determine transmission resource locations of first-class signaling messages associated with the synchronization signals according to the synchronization signals; and
  receive the first-class signaling messages on the transmission resource locations;
  wherein the processor is configured to determine the transmission resource locations of the first-class signaling messages associated with the synchronization signals according to the synchronization signals in one of the following manners:
  the transmission resource locations of the first-class signaling messages are in time-domain symbols same as the time-domain symbols of the synchronization signals bound to the first-class signaling messages;
  the transmission resource locations of the first-class signaling messages are in the time-domain symbols same as the time-domain symbols of the synchronization signals bound to the first-class signaling messages, and X1 time-domain symbols behind the synchronization signals bound to the first-class signaling messages, wherein the X1 time-domain symbols are consecutive time-domain symbols;
  the transmission resource locations of the first-class signaling messages are in the time-domain symbols same as the time-domain symbols of the synchronization signals bound to the first-class signaling messages, and X2 time-domain symbols preceding the synchronization signals bound to the first-class signaling messages, wherein the X2 time-domain symbols are consecutive time-domain symbols;
  the transmission resource locations of the first-class signaling messages are in the time-domain symbols same as the time-domain symbols of the synchronization signals bound to the first-class signaling messages, and X1 time-domain symbols behind the synchronization signals bound to the first-class signaling messages as well as X2 time-domain symbols preceding the synchronization signals bound to the first-class signaling messages, wherein the X1 time-domain symbols and the X2 time-domain symbols are consecutive time-domain symbols; and the transmission resource locations of the first-class signaling messages are in Y1 time-domain symbols behind or preceding the synchronization signals bound to the first-class signaling messages.

8. The apparatus according to claim 7, wherein the first-class signaling messages comprise at least one of the following:
a configuration message about a system parameter, or a configuration message about a broadcast parameter, or a configuration message about a multicast parameter;
a physical layer control message indicating physical layer transport configuration of the system parameter, or a physical layer control message indicating a physical layer transport configuration of the broadcast parameter, or a physical layer control message indicating a physical layer transport configuration of the multicast parameter;
a signaling configuration message transmitted in a physical broadcast or multicast channel; or
a signaling configuration message transmitted in a physical control channel, wherein the signaling configuration message transmitted in the physical control channel comprises a common control message and a specialized control message.

9. The apparatus according to claim 7, wherein the synchronization signals and the first-class signaling messages are associated in the following manners:
transmission of the first-class signaling messages and transmission of the synchronization signals meet a reference demodulation relationship;
the transmission of the first-class signaling messages and the transmission of the synchronization signals correspond to a same one selected from transmission beams, reception beams, virtual sectors, ports, antennas and transport nodes;
a transmission signal of the first-class signaling messages and a transmission signal of the synchronization signals meet a quasi-co-location relationship; and
a scrambling manner of the first-class signaling messages is associated with resource locations used for transmitting the synchronization signals, wherein the resource locations comprise at least one of the following: sequences, sequence locations, beams, sectors, antennas and ports.

10. The apparatus according to claim 7, wherein in a case where the transmission resource locations of the first-class signaling messages are in Y1 time-domain symbols behind or preceding the synchronization signals bound to the first-class signaling messages, the processor is further configured to:
determine locations of the Y1 time-domain symbols according to a resource index of the synchronization signals bound to the first-class signaling messages; or
determine that the Y1 time-domain symbols are adjacent to the synchronization signals bound to the first-class signaling messages.

11. The apparatus according to claim 7, wherein the synchronization signals are further used for indicating mapping information about the first-class signaling messages, wherein the mapping information comprises a bandwidth, a location and a multiplexing manner.

12. The apparatus according to claim 7, wherein the processor is configured to determine a scrambling code of the first-class signaling messages according to a resource index used by the synchronization signals associated with the first-class signaling messages.

13. A non-transitory computer-readable storage medium storing computer executable instructions that when executed by a processor cause the processor to perform:
receiving synchronization signals sent by a base station and detecting a sequence of the synchronization signals to implementing synchronization with the base station;
determining transmission resource locations of first-class signaling messages associated with the synchronization signals according to the synchronization signals; and
receiving the first-class signaling messages on the transmission resource locations;
wherein the processor performs determining the transmission resource locations of the first-class signaling messages associated with the synchronization signals according to the synchronization signals in one of the following manners:
the transmission resource locations of the first-class signaling messages are in time-domain symbols same as the time-domain symbols of the synchronization signals bound to the first-class signaling messages;
the transmission resource locations of the first-class signaling messages are in the time-domain symbols same as the time-domain symbols of the synchronization signals bound to the first-class signaling messages, and X1 time-domain symbols behind the synchronization signals bound to the first-class signaling messages, wherein the X1 time-domain symbols are consecutive time-domain symbols;
the transmission resource locations of the first-class signaling messages are in the time-domain symbols same as the time-domain symbols of the synchronization signals bound to the first-class signaling messages, and X2 time-domain symbols preceding the synchronization signals bound to the first-class signaling messages, wherein the X2 time-domain symbols are consecutive time-domain symbols;
the transmission resource locations of the first-class signaling messages are in the time-domain symbols same as the time-domain symbols of the synchronization signals bound to the first-class signaling messages, and X1 time-domain symbols behind the synchronization signals bound to the first-class signaling messages as well as X2 time-domain symbols preceding the synchronization signals bound to the first-class signaling messages, wherein the X1 time-domain symbols and the X2 time-domain symbols are consecutive time-domain symbols; and
the transmission resource locations of the first-class signaling messages are in Y1 time-domain symbols behind or preceding the synchronization signals bound to the first-class signaling messages.

14. The non-transitory computer-readable storage medium according to claim 13, wherein the first-class signaling messages comprise at least one of the following:
a configuration message about a system parameter, or a configuration message about a broadcast parameter, or a configuration message about a multicast parameter;
a physical layer control message indicating a physical layer transport configuration of the system parameter, or a physical layer control message indicating a physical layer transport configuration of the broadcast parameter, or a physical layer control message indicating a physical layer transport configuration of the multicast parameter;

a signaling configuration message transmitted in a physical broadcast or multicast channel; or a signaling configuration message transmitted in a physical control channel, wherein the signaling configuration message transmitted in the physical control channel comprises a common control message and a specialized control message.

15. The non-transitory computer-readable storage medium according to claim 13, wherein the synchronization signals and the first-class signaling messages are associated in the following manners:

transmission of the first-class signaling messages and transmission of the synchronization signals meet a reference demodulation relationship;

the transmission of the first-class signaling messages and the transmission of the synchronization signals correspond to a same one selected from transmission beams, reception beams, virtual sectors, ports, antennas and transport nodes;

a transmission signal of the first-class signaling messages and a transmission signal of the synchronization signals meet a quasi-co-location relationship; and a scrambling manner of the first-class signaling messages is associated with resource locations used for transmitting the synchronization signals, wherein the resource locations comprise at least one of the following: sequences, sequence locations, beams, sectors, antennas and ports.

16. The non-transitory computer-readable storage medium according to claim 13, wherein in a case where the transmission resource locations of the first-class signaling messages are in Y1 time-domain symbols behind or preceding the synchronization signals bound to the first-class signaling messages, the processor performs:

determining locations of the Y1 time-domain symbols according to a resource index of the synchronization signals bound to the first-class signaling messages; or determining that the Y1 time-domain symbols are adjacent to the synchronization signals bound to the first-class signaling messages.

17. The non-transitory computer-readable storage medium according to claim 13, wherein the processor performs determining a scrambling code of the first-class signaling messages according to a resource index used by the synchronization signals associated with the first-class signaling messages.

* * * * *